Feb. 11, 1930.  R. A. STEPS  1,747,090
MIXER TYPE CENTRIFUGAL CONTROL
Filed July 18, 1927  6 Sheets-Sheet 1
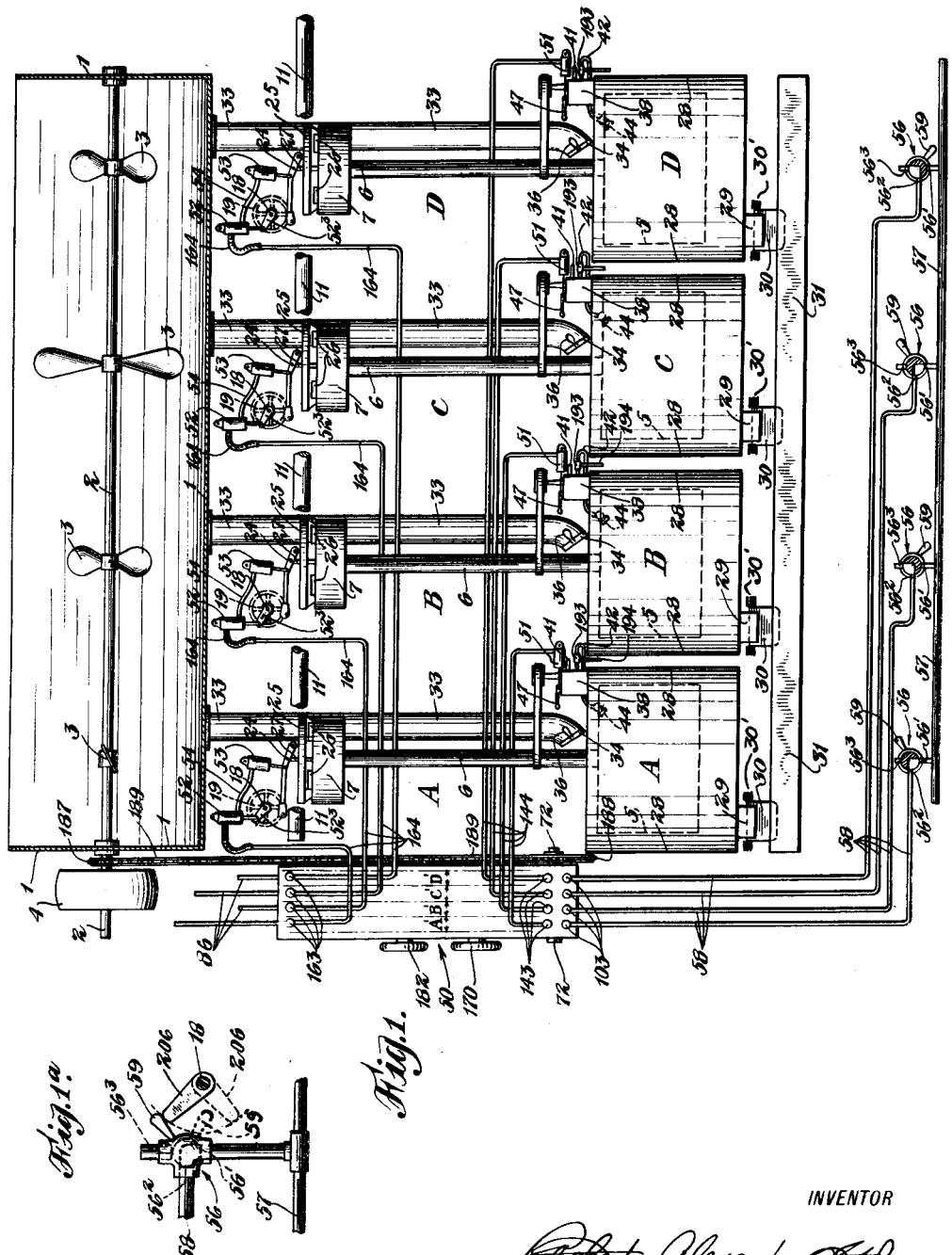
INVENTOR

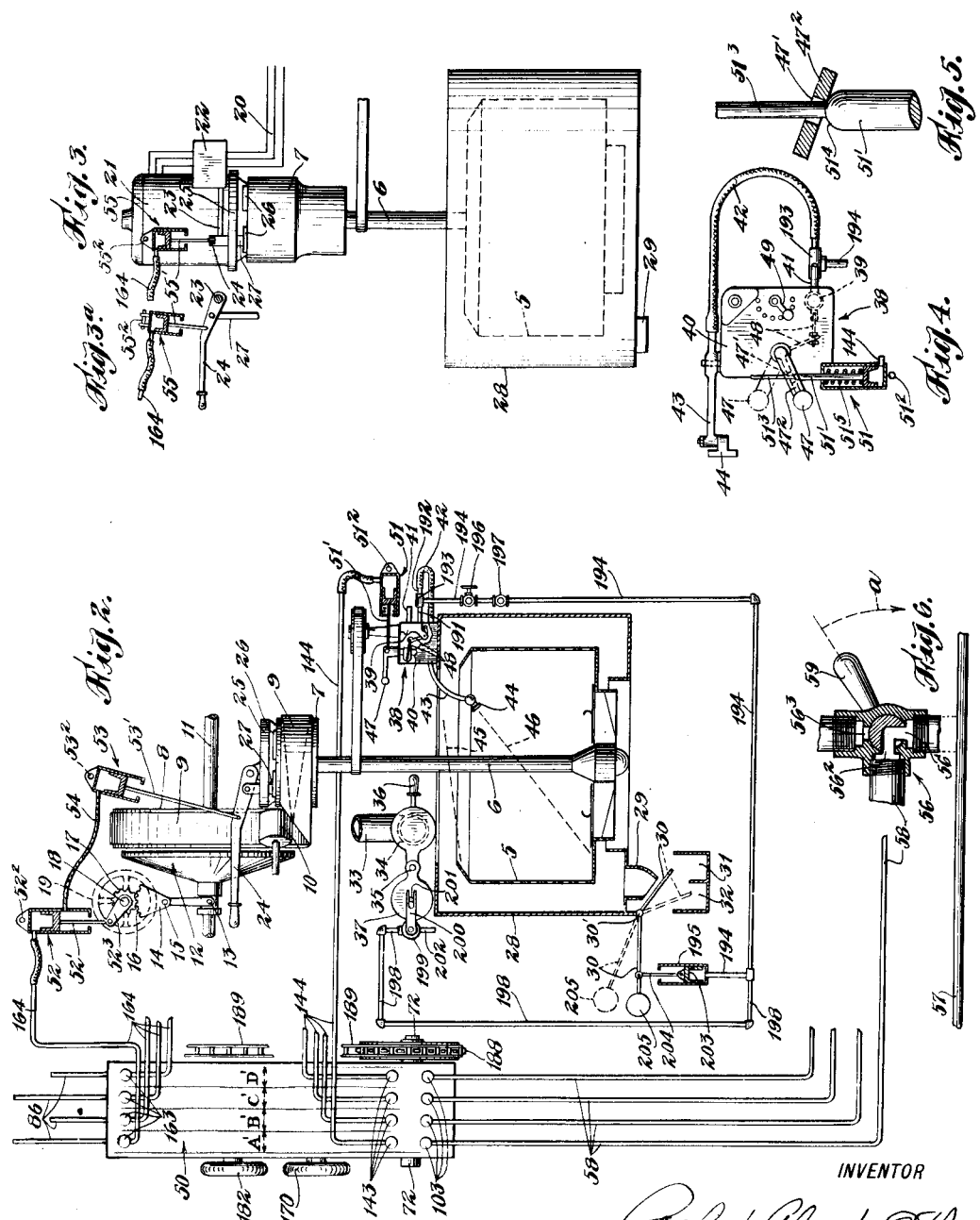

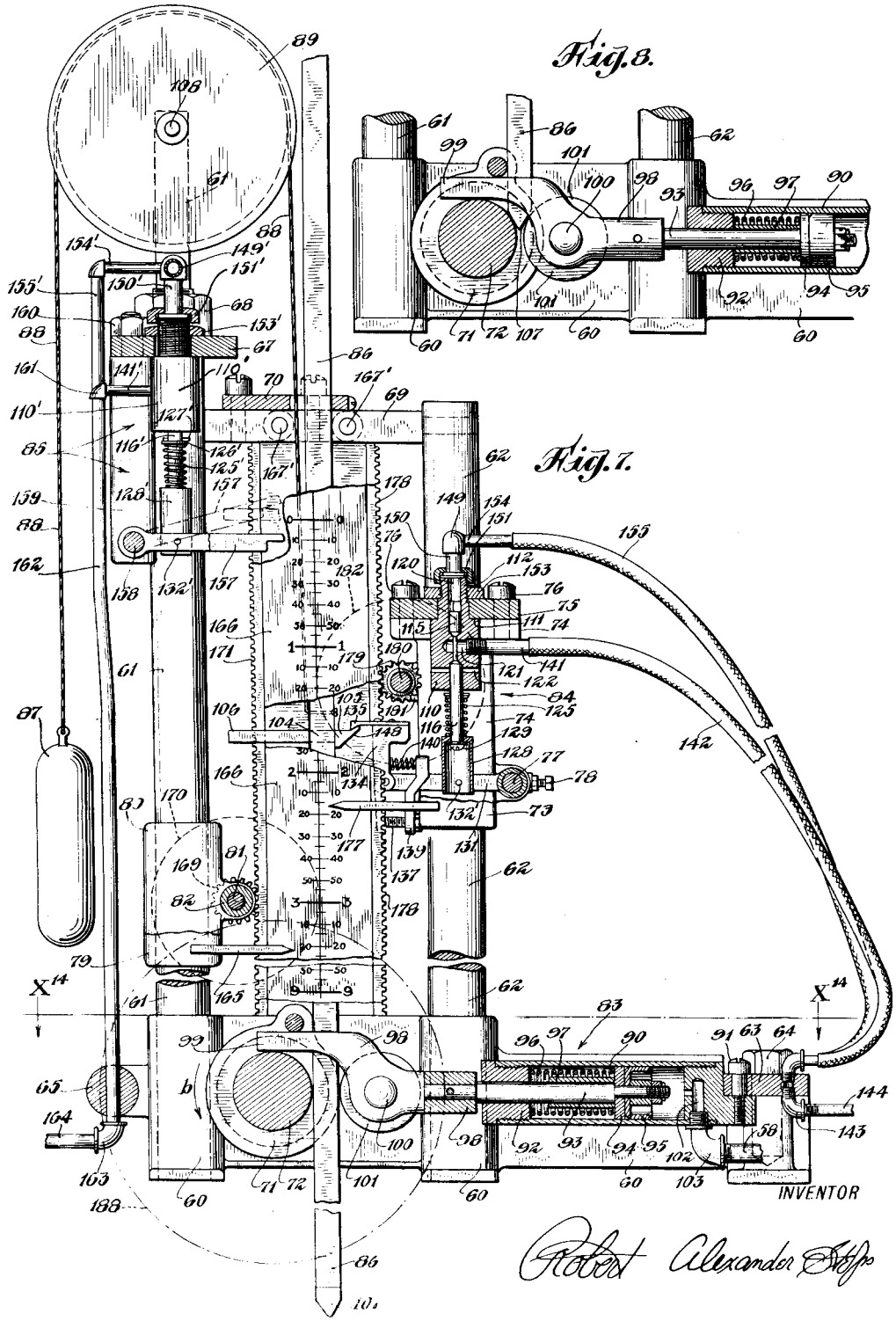

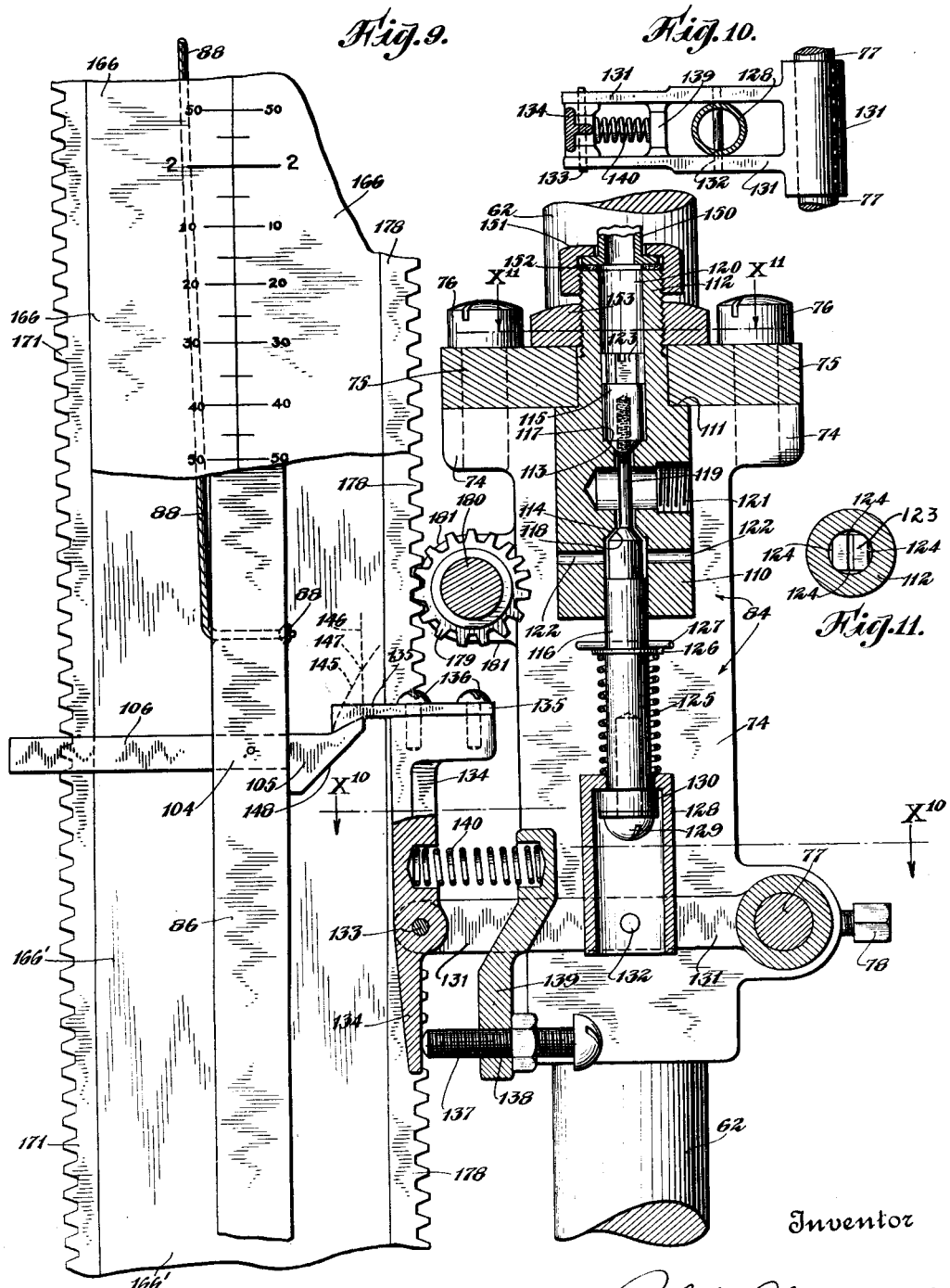

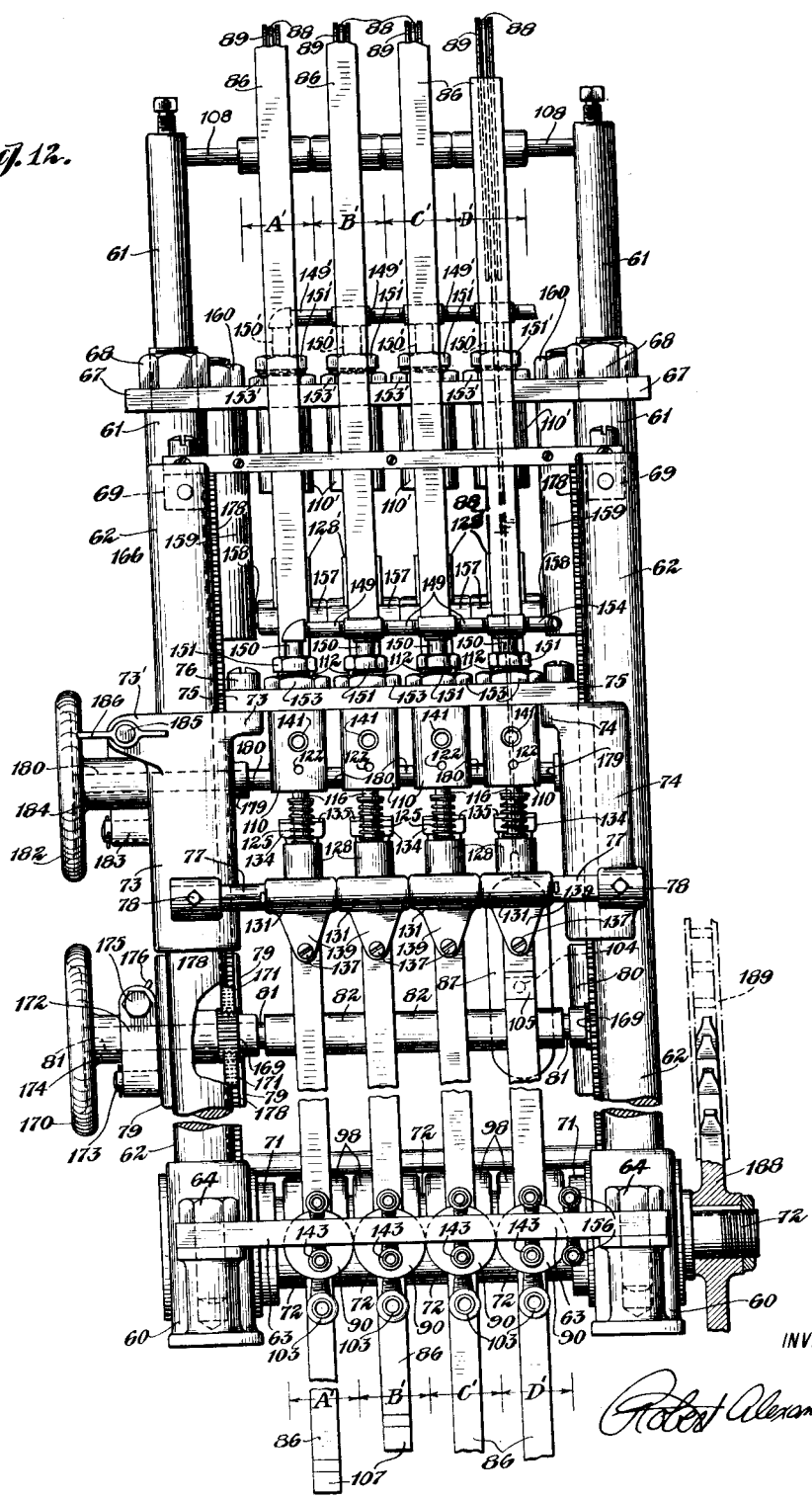

Feb. 11, 1930.  R. A. STEPS  1,747,090
MIXER TYPE CENTRIFUGAL CONTROL
Filed July 18, 1927  6 Sheets-Sheet 6

Inventor
Robert Alexander Steps

Patented Feb. 11, 1930

1,747,090

UNITED STATES PATENT OFFICE

ROBERT ALEXANDER STEPS, OF LOS ANGELES, CALIFORNIA

MIXER-TYPE CENTRIFUGAL CONTROL

Application filed July 18, 1927. Serial No. 206,726.

This invention relates to important improvements in automatic controls for centrifugal machines.

In the sugar, chemical, mining and other industries where centrifugal machines are used, they are ordinarily operated in groups consisting of three, four or more centrifugals per group. Sometimes the group consists of as few as two centrifugals, and sometimes of as many as twelve centrifugals, but usually there are about six of these machines per group.

It is common to talk about the entire group of centrifugals as a "mixer", for the reason that there frequently is a large mixer tank for holding the material to be centrifuged, located above the centrifugals and equipped with descending chutes or spouts, one for each centrifugal, through which the material is periodically fed from the mixer tank to each of the centrifugals as the centrifuging process progresses.

Out of this arrangement of the centrifugals in groups fed from a common tank above, there arises certain conditions and relationships which I have taken advantage of for the purpose of greatly simplifying and improving the automatic control equipment which governs the operation of the individual centrifugal.

At any given instant the material throughout the mixer tank is substantially uniform, and for that reason all the centrifugals in the group should operate uniformly upon this material. If the centrifugals operate uniformly the resulting product will tend to be uniform, but if there are differences in operation between the different centrifugals in the group, the product discharged from the different machines will tend to vary and this is not so good as when it is uniform.

In the ordinary mode of operating centrifugals, various minor but important operations are performed manually, and in a certain time sequence with respect to each other that is timed as accurately as the faculties of the human operator permits him to judge. For instance, at the proper time after the centrifugal is started he turns on the wash water if wash water is used; at a given time thereafter he throws the gutter or gate if a separation of liquors is made; and in all cases after a certain time has elapsed he stops the centrifugal and this completes the cycle. The material is discharged from the centrifugal, a new charge is taken in, and the above steps constituting the cycle are repeated with as nearly the same time intervals between the respective steps in successive cycles as the man can provide by relying only on his physical faculties for measuring time, as it would not be practical for other reasons for him to use a watch or clock for this purpose. Obviously however the faculties of an ordinary laborer are not always dependable for the accurate measuring of time periods, and consequently the above steps are often performed with considerable variations in the periods lapsing between them, and this is not desirable for reasons previously given.

One of the purposes of this invention is to provide a simple and dependable automatic equipment by means of which the above designated steps in the cycle can be automatically performed in definite but adjustable time relation with regard to each other, thereby taking these tasks out of the hands of the laborer and placing them on the machine, which not only saves labor, but insures more uniform and accurate timing of the steps than could be previously expected when the men were depending on their faculties as a means of measuring the time.

My present invention however, goes further than this.

As previously indicated, the material which is at any instant being fed from the mixer tank to the centrifugals, is practically uniform as to all the centrifugals in the group that works from that mixer, but as time progresses the character of the material often changes gradually, due to settling or cooling in the mixer tank, etc., and also when one batch of material is completely worked out of the mixer tank so that the same is empty, and a new batch is dumped into it, the new batch is usually somewhat different than the old batch, and therefore requires somewhat different working in the centrifugals. It should be noticed that even though the material coming from the mixer tank varies from time to time, for any of the reasons just given, nevertheless this variation is practically uniform as to all the centrifugals in the mixer, and therefore in spite of these over-all variations, the fact remains that at any given instant the material charged into the centrifugals is uniform as to the different machines. The centrifugal machines therefore should work uniformly with reference to each other. That is, the above mentioned time intervals between the successive steps in the cycles should at any instant be uniform as to all the centrifugals in the group or mixer. As the material from the mixer changes however, the working of the centrifugals should be changed to suit. That is, the above mentioned time intervals between the steps should be changed, either by lengthening or shortening as the case may be. But in view of the relations above described it is apparent that any change in the centrifugal operation should be uniformly made as to all the centrifugals in the group, in order to keep the group operation uniform though changed. With the ordinary forms of automatic centrifugal controls, it is necessary for the operator to separately change and adjust each of the individual centrifugals, or in other words if there are six centrifugals in the group, he must change the various settings six separate times on the six separate controls, and since this is rather laborious owing sometimes to the rather inaccessible location of the control units, and sometimes to other causes, the operators are frequently reluctant and careless about changing these adjustments even though they may realize that the changed character of the material may warrant same.

It is this situation which is greatly relieved and improved by my invention set forth in this application. It is an important feature of this invention that it concentrates in one machine all the control equipment for all the centrifugals in the group or mixer, and has the various parts and members of this control equipment so arranged that when the operator changes any of the above mentioned time intervals for one centrifugal, that act simultaneously and automatically changes that interval for all the centrifugals in the mixer. Obviously this greatly simplifies the labor of changing the various adjustments referred to, and by making this work simple and easy to perform, the men are naturally encouraged to do it much more frequently, and to watch the changing conditions of the material carefully so as to promptly adjust the group operation of the centrifugals to suit, all of which naturally reflects favorably on the final uniform character of the product leaving the centrifugals. In addition to the simplification in the actual making of the adjustments, some further advantage is gained by simplification of the parts and structure of such a centralized control unit which governs all the centrifugals in the group. Also such a centralized group or mixer control can be located at a place that is readily accessible to the operator, and at a place that is light and also entirely free from any danger of the rapidly rotating machinery that characterizes the average centrifugal station. All of these features which characterize my group control idea, tend greatly to increase the usefulness, durability and efficiency of such automatic centrifugal control equipment especially in comparison with the ordinary arrangement whereby each centrifugal has its own complete complement of automatic control equipment which, as above mentioned, must be separately adjusted for each centrifugal. So far as I am aware I am the first to propose this grouping of the control equipment into a concentrated machine that controls all the centrifugals in the mixer, and that is so arranged that the adjustment of the time intervals is simultaneously accomplished as to all the centrifugals in the mixer. In this sense my invention is basic and pioneer. The detailed parts, arrangements and sub-combinations of the machine which I am about to describe as illustrating one embodiment of this invention, can of course be changed and varied extensively without departing from the spirit of this invention in its broader aspects as just set forth.

Other objects, benefits and advantages of this invention will become clear by the consideration of the following description, and also from the accompanying drawings, and from the claims.

In the drawings Fig. 1 is a diagrammatic illustration of one form of my invention in connection with a mixer consisting of four centrifugals.

Fig. 1ª represents a modification of certain details that will be referred to later.

Fig. 2 is similar to Fig. 1 but shows only one centrifugal, and shows several essential parts that were omitted in Fig. 1 for purposes of clearness.

Fig. 3 shows one feature of the invention as applied to a different type of centrifugal from that illustrated in Fig. 2.

Fig. 3ª is a side view of some of the parts shown in Fig. 3.

Fig. 4 illustrates a detail of the washing equipment which will be described later.

Fig. 5 is an enlarged view, partly in section, showing some parts not clearly brought out in Fig. 4.

Fig. 6 is an enlarged diagrammatic view of a valve used in connection with this form of the invention.

Fig. 7 is a side view, partly in section, of the particular embodiment of my invention, which I desire to describe in this application.

Fig. 8 is a fragmental view showing certain parts in a different relation from that shown in Fig. 7.

Fig. 9 is an enlarged fragmental view, partly in section, showing certain parts not so clearly illustrated in Fig. 7.

Fig. 10 is a partial section taken along the broken line $X^{10}$—$X^{10}$, Fig. 9.

Fig. 11 is a partial section through a valve taken on line $X^{11}$—$X^{11}$, Fig. 9.

Fig. 12 is a front assembly view of the machine shown in Fig. 7, some of the parts being broken away for purposes of clearness.

Figure 13:
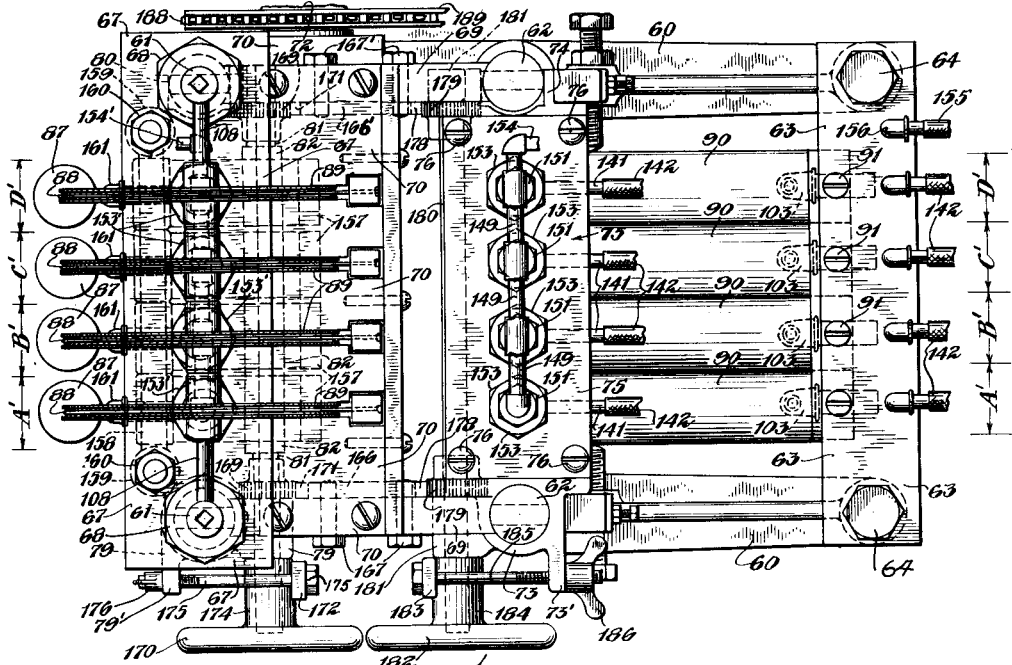

Fig. 13 is a top view of the machine shown in Fig. 7.

Figure 14:
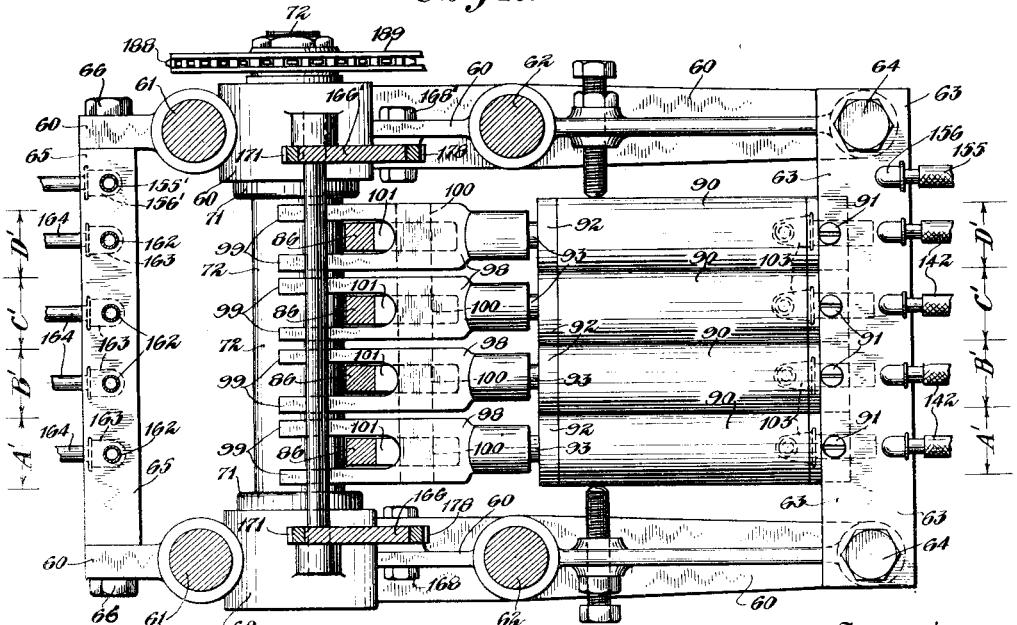

Fig. 14 is a plan section taken on the line $X^{14}$—$X^{14}$, Fig. 7.

By reference to Figs. 1 and 2, the general arrangement of the centrifugal station can best be seen. Fig. 1 shows the mixer tank 1 into which the material to be centrifuged is dumped, this tank frequently being of sufficient capacity to hold 50 tons or more. If the character of the material is such as to require stirring in order to preserve its uniformity of mixture, a mixer shaft 2 is furnished, having the stirring blades 3 thereon. This shaft turns slowly under the power of a belt (not shown) running on pulley 4.

Below the tank Fig. 1 shows a group of four centrifugals constituting the so-called mixer group previously described. These centrifugals are respectively designated as A, B, C and D. For simplicity and clearness of illustration these four centrifugals are only shown in their barest outline in Fig. 1, but Fig. 2, though still only a diagrammatic view, illustrates the parts of each centrifugal a little more clearly. The following description, based on Fig. 2 will be understood to apply to each of the four centrifugals shown in Fig. 1 even though many of the detailed parts are omitted from the latter figure.

As far as possible the refence numerals used in Fig. 2 are carried over to each of the four centrifugals in Fig. 1 in order to point out the corresponding parts in the latter view.

In a general way the centrifugal proper consists of a basket 5 having a foraminous wall. This basket revolves with spindle 6 to the upper end of which a pulley 7 is rigidly attached. This spindle and pulley are rotated by a driving means consisting of the larger pulley 8 and the quarter twisted belt 9 running under idler pulley 10. When the pulley 8 revolves the centrifugal revolves because of the belt drive which connects them in the manner just described. Through the center of the large pulley 8 passes the constantly rotating power shaft 11, it being understood however that pulley 8 is loose on this shaft and is not rigidly keyed to it. Therefore the power shaft 11, which is in fact the power source or power supply that furnishes the energy for turning the centrifugals, can continue to rotate even though pulley 8 is not rotating. The mechanism by which the centrifugal drive means can be connected and disconnected with the constantly rotating power shaft 11, for the purpose of starting and stopping the centrifugal, will now be described. This mechanism consists in a train of parts starting with a clutch 12 which is indicated only diagrammatically in Fig. 2 for the reason that this clutch is a standard mechanism and its parts and construction are well understood in the industries and need therefore not be shown in detail here. This clutch is actuated by a pin 13 carried at the lower end of a segment casting 14, the latter being pivotally carried or supported on a pin 15. The upper end of segment 14 is provided with teeth 16 which mesh with the teeth on pinion 17. This pinion 17 is carried on a shaft 18, and on this shaft there is also mounted a handwheel 19. This handwheel 19 is so located on the centrifugal station as to be conveniently accessible for the man who operates the centrifugal. When he rocks this handwheel one way or the other the motion is imparted through shaft 18, pinion 17, sector 14, and pin 13 to move the latter back and forth which actuates clutch 12 to frictionally engage or disengage the inner face of pulley 8. It is in this way that the operator connects or disconnects the loose drive pulley 8 with the constantly rotating power shaft 11.

As indicated in Fig. 1 the constantly rotating power shaft 11 runs lengthwise of the centrifugal station, and behind the centrifugals, and the train of mechanism for driving the centrifugal, and for connecting and disconnecting the driving means with power shaft 11, as just described and shown in Fig. 2, is repeated and duplicated for each of the four centrifugals even though these parts, for purposes of clearness, have been omitted from Fig. 1.

The power arrangement shown in Fig. 2 corresponds to what is known as the standard belt drive, but many centrifugals are driven by what is known as the direct connected electric drive, and this is diagrammatically illustrated in Fig. 3. In this type of drive the power supply consists in the electric power line 20, instead of the previously described constantly rotating power shaft 11; the driving means consists of the electric motor 21, instead of the belt and pulley previously described; and the means for connecting and disconnecting the driving means with the power source consists of the standard switch-box 22 instead of the clutch and train of connected parts previously described in connection with Fig. 2. The switch in box 22 is standard, and being well known as an article of commerce, need not be described or illustrated in detail. The rocker shaft 23 enters this box and at one end this shaft is rigidly connected with operating lever 24, and at the other end in the box it is rigidly connected to actuate the switch parts, so that when lever 24 is raised to its uppermost position the switch-box 22 establishes electrical connection between the power line 20 and driving motor 21 to drive the centrifugal, whereas when lever 24 is drawn downward the switch is opened through the action of shaft 23 and the motor is disconnected from the power supply. Excepting as to the drive parts, all other parts of the electric driven centrifugals illustrated in Fig. 3, are identical with those shown in Fig. 2, and consequently those other parts have been omitted from Fig. 3 as same will be thoroughly understood from Fig. 2.

The weight of the revolving spindle 6, and its connected parts, is carried on the standard centrifugal head 25 located near the top of the centrifugal, this head in its turn being supported by structural steel girders which have been omitted from the drawings for simplicity and because they do not enter into this invention.

To bring the centrifugal to rest after the power is disconnected a standard brake is provided on all centrifugals. This brake is also well known in the trade, and therefore it is only shown diagrammatically in the drawings. In its general aspects this brake consists of brake shoes 26 which are adapted to engage the inner surface of pulley or drum 7, Figs. 2 and 3, and these brake shoes are internally connected to link 27, which at its upper end is connected with hand lever 24. When this lever is drawn downward the shoes 26 are pressed outward to engage the pulley or drum 7 to bring the centrifugal to rest, and when lever 24 is raised the brake is disengaged and the spindle turns freely. As previously indicated the further details of this brake need not be illustrated, because the particular details of the brake do not enter into this invention and it would only complicate the drawings to attempt to show such details, which are well understood in the trade anyhow.

Around the basket 5 is mounted a stationary curbing 28 which collects the liquor that is spun out through the foraminous cylindrical wall of the basket. At the bottom of this curbing there is a drain spout 29 from which the liquor runs onto a movable gate 30 which is pivotally mounted on pin 30' to direct the liquor from spout 29 into trough 31 or trough 32. When the gate is in its full line position shown in Fig. 2 the liquor goes into trough 31, but when this gate is rocked into its dotted line position, as shown in Fig. 2, the liquor is directed into trough 32.

For the purpose of feeding a charge of material from the mixer tank 1 into the centrifugal basket 5, a chute or spout 33 leads downward from the mixer tank to each centrifugal. At the bottom of this spout there is a charging gate 34, see Fig. 2, which is pivotly mounted on pin 35. When this gate is in its full line position shown in Fig. 2 it closes off the outlet at the lower end of spout 33, so that no material can pass out from same, but when the operator raises this gate by means of handle 36, the gate rocks upward around the pivot 35 to uncover the mouth of the spout and the material flows downward through the spout from the mixer tank into the basket 5, the gate 34 being again closed when a sufficient charge of material has been loaded into the basket. Since the gate 34 is heavy, it has been balanced by a counterweight portion 37, cast integrally with the gate portion 34, but on the opposite side of pivot 35, which permits the man to operate the gate quite easily.

In order to wash the material in the centrifugal some suitable form of washing means including a nozzle and a fluid valve for turning the washing fluid on and off, is ordinarily used. For the purposes of this invention any form of washing means whatsoever may be used, and though water is the usual washing fluid, nevertheless any suitable or usable fluid desired may be used such as syrup, clear saturated sugar solution, steam, etc. Though any form of washing means may be used, crude or complex, nevertheless in the drawings, Figs. 1, 2 and 4, I have shown and designated by reference numeral 38 a very efficient and well known form of washing means known as the Hartman washer, the detailed parts and operation of which is fully shown and described in United States Patent No. 1,439,676, dated December 19th, 1922, granted to W. W. Hartman. Reference should be made to said patent for details of the washer construction as such details are not repeated in this application. In this particular washer the fluid valve 39 is located within the washer box 40. The washing fluid is led to this valve through pipe connection 41 under constant pressure from a source not shown in the figures, and when this valve 39 is opened the wash fluid passes out through connections including the flexible hose 42 and tubular rocker arm 43 to nozzle 44 from which the fluid is sprayed onto the material in the centrifugal. In this Hartman washer the nozzle 44 is oscillated up and down, so that the spray sweeps up and down between the top and bottom limits indicated by lines 45 and 46 in Fig. 2, thereby covering all the material in basket 5. In order to open valve 39 to start the washing operation, there is provided in this washer a control handle 47 which connects with valve 39 through a series of links 48 whereby the valve is opened and closed as the washer handle 47 moves back and forth. As a matter of fact in this Hartman washer the fluid valve 39 is a time controlled valve, as is fully described and pointed out in the said Hartman patent. In the usual previous mode of operating this washer, the operator manually moved control handle 47 from its full line to its dotted line position shown in Fig. 4, thereby opening fluid valve 39 and setting into oscillating motion the rocker arm 43 and nozzle 44. In this way the washing fluid commenced and continued to spray upon the material in the rapidly revolving basket 5, the washing spray sweeping up and down between the limits 45 and 46 as previously indicated. As this washing operation continued, the automatic timing mechanism within the washer box 40 gradually moved around to the cut-off position for which the washer was set, and when this position was reached, corresponding to the time through which the washing fluid was to be applied for quantity measurement, the washer automatically cut itself out of operation by allowing the control handle 47 to snap back from its dotted line to its full line position shown in Fig. 3, thereby closing fluid valve 39 and discontinuing the oscillating movement of the arm and nozzle 43 and 44. Though this particular form of washer is very efficient, which is the reason for my showing it in these drawings, nevertheless as previously indicated, any form of washing means whatsoever may be used in connection with this invention so long as it contains a fluid valve of some sort, and some sort of a nozzle for applying the washing fluid to the material in the centrifugal.

As previously mentioned, all the equipment thus far described in this application is standard, well known factory equipment which is in common and extensive use today, and for this reason all of this equipment has been shown only diagrammatically, the structural details being omitted for purposes of clearness.

In order that the connection and manner of co-action between this standard equipment and my control equipment can be more clearly understood, I will first briefly describe the present manual mode of operating the previously described standard equipment.

As any of the centrifugals A, B, C or D in the mixer group reaches the end of its cycle, the operator for that centrifugal discharges the centrifuged material therefrom in readiness for the next cycle. He then starts the centrifugal on its next cycle by raising the charging gate 34 by means of lever 36, which permits material to flow from mixer tank 1 down through spout 33 into the basket, until a sufficient charge is introduced, at which moment the operator lowers lever 36 to close charging gate 34, which obviously cuts off the flow of material into basket 5. After the centrifugal is so charged, or during the charging operation, the operator starts the centrifugal turning. With the belt driven centrifugal shown in Fig. 2, he does this by turning handwheel 19 in the correct direction, which as previously described causes the clutch to operatively connect the centrifugal driving means with the power source, i. e., with the constantly rotating power shaft 11, and as a result of this engagement the centrifugal commences to turn under the power transmitted through pulley 8 and belt 9 to the pulley 7 and spindle 6. With the electric driven centrifugal shown in Fig. 3, the machine is started turning by raising lever 24 to its uppermost position, which as previously described connects the driving motor 21 with the electric power supply line 20 by means of the standard switch box 22, and thereupon the centrifugal starts turning with the motor. Both with the belt driven and electric driven types of centrifugals, the machine soon reaches full speed, and the free liquor portion of the material charged into the basket gradually spins out through the foraminous cylindrical wall of the basket under the centrifugal forces set up by the rotation, but the solid portions of the material remain in the basket as the openings in the cylindrical wall of same are too fine for the solid portions to pass through. The liquor thus spun out of the basket is caught by the inner surface of curbing 28, from which it drains down and out through drain spout 29 onto the liquor gate 30, and thence into the original liquor trough 31. The spinning proceeds in this manner for a definite time, presumably until all of the free original liquor that can be spun out of the basket has been exhausted from same, after which period, the length of which the operator instinctively measures by his faculties, the operator starts up the washing action by moving the washer control handle 47 to its going position as previously indicated. This opens the fluid valve and the washing fluid is sprayed onto the rapidly revolving material in the basket to wash or purge the same free from the last traces of the original liquor that adhered to the material. This wash liquor of course passes out through the openings of the basket in the same manner that the original liquor did, and is collected by the curbing 28. For various reasons it is often desirable to collect this wash liquor separately from the original liquor, and this is the function of the movable gate 30 and of the two troughs 31 and 32. If such separation is desired, the operator usually allows a brief period to elapse after he started the washing operation going. During this brief period the original liquor which covers the inner wall of the curbing at the instant that the washing operation commenced, has an opportunity to completely drain down from the walls of the curbing onto to gate 30 which continues to direct it into the original liquor trough 31. After the expiration of such brief period however the wash liquor comes down onto rate 50, and the operator by means of a hand lever not shown in the drawings, shifts gate 30 to its dotted line position shown in Fig. 2, which directs the wash liquor into the wash liquor trough 32, thereby effecting the separation from the original liquor in trough 31. The washing action continues until the quantity of washing fluid corresponding to the time for which the quantity or time index 49 of the Hartman washer, see Fig. 4, is set, is dispensed, after which the washer automatically closes the fluid valve 39, and the flow of washing fluid ceases. The centrifugal continues to rotate for a further period during which the material in the basket is freed and dried by spinning out onto the curbing. At the end of this period which the operator also instinctively measures or judges by his faculties, he stops the centrifugal. With the belt driven centrifugal shown in Fig. 2 he does this by turning the handwheel 19 in a direction opposite to that which he used when starting the centrifugal. This disconnects the clutch and releases the driving means from the constantly rotating power shaft 11. The centrifugal being thus freed from the power source, he pulls down the brake lever 24 and the brake quickly brings the centrifugal to rest. With the electric driven type of centrifugal shown in Fig. 3, the operator stops the machine by merely drawing lever 24 from its uppermost to its lowermost position, which simultaneously disconnects the driving motor from the electric power supply by opening the switch in box 22, and also sets the brake through the agency of link 27 as previously described. When the centrifugal, either belt or electric driven type, is brought to rest the operator discharges the material therefrom. This discharging operation is usually performed by a mechanical discharger not shown in the drawings for the reason that same has no direct connection or co-action with this invention and for the further reason that such dischargers are common and well known in the trade. During the discharging operation however the operator causes the centrifugal to turn slowly so that the discharger can safely scrape the material out of the basket. When all the material is so discharged the cycle for that centrifugal is finished, and the operator starts the machine on its next cycle, which repeats the sequence of steps just described, and so on, cycle after cycle, not only for that centrifugal but for all the centrifugals in the mixer group, until all the material in the mixer tank has been worked through the centrifugals. In concluding this description of the mixer operation it is important to notice that the centrifugals operate entirely independently of each other. That is, any one centrifugal can be started separately and irregardless as to whether any of the other centrifugals in the group are started or not, or in other words each centrifugal can be started in independent time relation to the others. Likewise each of the successive steps in the cycle, to wit: starting the washing action, throwing the liquor gate from one trough to the other, and stopping the centrifugal, are all performed independently, or in independent time relation so far as the different centrifugals are concerned. Notwithstanding the fact however that any one of these steps is performed entirely independently as between the different centrifugals, so that the cycle can be started at any time for any one centrifugal independently of the others, nevertheless the important fact remains that the time cycle for all the centrifugals is substantially the same, i. e., the corresponding time intervals between the successive steps of the cycle is substantially the same for all the centrifugals in the group even though the centrifugals otherwise operate independently of each other. This kind of independency of the centrifugals one from the other, is important in order that economy of power, labor distribution, etc. can be preserved.

It will be noticed from the description in the previous paragraph that under the usual manual mode of operating the centrifugal station, the time cycle for each centrifugal, i. e., the time periods elapsing between the successive manual steps of starting the washing action and stopping the centrifugal, are all measured instinctively by the faculties of the operator, and apart from the fact that this requires his attention which could otherwise be devoted to more productive effort, it is also obvious that his instincts are not entirely accurate and dependable means for measuring these time periods. Consequently these time periods in practice are often irregular, and therefore the character of the centrifuged product is not quite as uniform as it would be if these time intervals were themselves regular and uniform.

It is for the purpose of correcting these discrepancies of manual operation, and also for the purpose of saving labor, that I have developed the automatic control ideas constituting this invention, and particularly the new basic improvements of the unitary mixer control which gives ease and accuracy of adjustment and simplification of parts and apparatus as has been previously referred to, and which I will now describe.

It is a characteristic feature of this mixer type control, that it should include automatic control means adapted to automatically perform the above described manual steps preferably in independent time relation as between the different centrifugals, but according to a definite time cycle that is substantially equal and uniform for all the centrifugals in the group, and also that such automatic control means should have some sort of adjusting means for changing the length of the predetermined periods of time constituting the cycle, simultaneously, and preferably equally, for all of said centrifugals. This latter is one of the basic conceptions in the present invention.

The mechanism embracing the broad conception stated in the preceding paragraph, can of course be arranged in a great many different ways.

One embodiment of this invention, which I am about to describe, and which is illustrated in the drawings, embraces the further idea of using more or less separate control mechanism for each centrifugal, or in other words in arranging the automatic control means to include more or less separate sets of control parts, one set for each centrifugal, and to then arrange these sets of control parts in such relation to each other that some sort of adjusting means can be made to co-act with, or to serve all of the sets of parts practically in common for the purpose of changing the above described predetermined periods of time simultaneously for all of the centrifugals in the group.

The form and character of the different parts constituting such separate sets of control parts for the various centrifugals, and also the manner in which these parts co-act with each other and with the common adjusting means, can of course vary considerably, and I am aware that for the purpose of transmitting to the various centrifugals the control impulses set up or released by my automatic control means, various forces such as electricity, water pressure, direct mechanical action, etc., can be utilized as well as compressed air which is the force utilized in the particular embodiment of my invention which I have elected to illustrate in the accompanying drawings, and which I will now describe more fully, but to which my invention is not limited.

It should be noticed at the outset that this particular embodiment of my invention may be described as using a centralized control machine, by which I mean that the various sets of control parts for controlling the various centrifugals are concentrated and assembled on a common frame or structure to comprise a unitary machine, which arrangement I prefer over the other alternative of spreading out these various sets of control parts along the centrifugal station and likewise extending the common actuating or adjusting members along the centrifugal station to co-act with the various sets of control parts so spread out.

In Figs. 1 and 2 my centralized control machine is diagrammatically indicated by reference numeral 50, and from this machine there runs out several small pipes or tubes to each centrifugal for transmitting back and forth compressed air, which as previously indicated, is the power medium by which I prefer, in this form of my invention, to perform the various control functions required by the centrifugals.

Before describing the details of the control machine 50, it would be helpful to describe the particular control members located right at the centrifugals for the purpose of there utilizing the compressed air impulses which the control machine proper releases or supplies to them at the correct moments in the cycle to actuate and cooperate with the previously described standard centrifugal equipment for controlling or automatically leading the centrifugal through its cycle.

These parts are best illustrated in Figs. 1 and 2, and comprise principally cylinders 51, 52 and 53. Cylinder 51 starts the washer, while cylinders 52 and 53 cooperate in stopping the centrifugal. Cylinder 52 disconnects the power and cylinder 53 applies the brake. Each of these cylinders has a movable air tight piston and piston rod respectively designated for the different cylinders by reference numerals $51'$, $52'$ and $53'$; and likewise each of these cylinders is pivotly mounted on a pin respectively designated as $51^2$, $52^2$ and $53^2$, these pins in their turn being supported by suitable steel structure which has been omitted from the drawing for purposes of clearness. The connection between cylinder 51 and washer 38 is best shown in Fig. 4, assisted by Fig. 5. As there shown the outer extremity $51^3$ of the piston $51'$ is of reduced diameter, and passes loosely through a hole $47'$ in web $47^2$ which is an integral part of the washer control lever 47. As shown in Fig. 5 this construction produces a substantial shoulder $51^4$ on the piston $51'$, and this shoulder butts against the web $47^2$ of the control lever. It is therefore apparent that when compressed air is admitted behind the piston in cylinder 51 this shoulder $51^4$ pushes against the web $47^2$ and thereby moves the washer control lever 47 from its full line position shown in Fig. 4 to its dotted line position, just as the hand of the operator was accustomed to do in the previous manual mode of operating the centrifugals. As has been previously described, this action opens the time controlled wash fluid valve 39 in the washer and the washing action proceeds in usual manner. As will be subsequently described, the compressed air acts in cylinder 51 only for a few moments, and is then released, after which the spring $51^5$ retrieves piston 51 to its original poistion, the length of the piston portion $51^3$ being such as not to become disengaged from hole $47'$ because of this retrieving action. By independently retrieving piston $51'$ in this manner, the washer control handle 47 is permitted, in the usual manner of these Hartman washers, to freely snap back to close valve 39 at the end of the washing action, without encountering friction or resistance from the piston and cylinder. Turning now to the power cutoff cylinder 52, it is noticed that the piston 52' of same is connected to a crank 52³ which is rigidly fastened to shaft 18, so that when compressed air is admitted behind the piston in cylinder 52, the force of same acts through crank 52³ to turn shaft 18 the same as the hand of the operator previously turned this shaft by means of handwheel 19. The direction of this thrust is so arranged that the clutch disengages the centrifugal drive means from the constantly rotating power shaft 11, thereby disconnecting the centrifugal from the power supply when the compressed air is admitted to cylinder 52. In regard to the brake cylinder 53 it is also noticed that its piston 53' is connected to the brake lever 24, so that when compressed air is admitted behind the piston in cylinder 53 it pushes lever 24 downward to apply the brake. In the belt driven centrifugal shown in Fig. 2 it is also noticed that the compressed air is admitted to cylinder 53 by means of a flexible tubing connection 54 which enters the lower part of cylinder 52. The purpose of this is so that no compressed air can enter cylinder 53 until the piston 52' in cylinder 52 has reached practically the lowermost point in its stroke, at which time the crank 52³ and shaft 18 would have been already actuated to disconnect the power before the compressed air from within cylinder 52 can be by-passed through tube 54 to the brake cylinder 53 to apply the brake. This arrangement insures that the power will be disconnected before the brake is applied, which saves the belt and transmission equipment from the undesirable possibility of occasionally having the brake applied before the power is disconnected. In the electric driven type of centrifugal shown in Fig. 3 the single cylinder 55 having the piston 55' connected with control lever 24, takes the place of the two cylinders 52 and 53 in the belt driven centrifugal shown in Fig. 2. This one cylinder 55 performs the double function of disconnecting the power in switchbox 22 and of applying the brake blocks 26 because these two functions are interlocked through control lever 24 in this electric driven centrifugal, as has been previously described.

From the foregoing description of the cylinders 51, 52, 53, and 55 it will be apparent that when compressed air is respectively released to them by the control machine at the proper moments in the cycle, these cylinders will first start up the washing action and later stop the centrifugal, without the attention of the operator being required for these purposes.

At each centrifugal, and for the purpose of placing that centrifugal under the influence of the control machine at any desired time, there is located a three-way hand valve 56, see Figs. 1, 2 and 6. In regard to this hand valve Figs. 2 and 6 should be read together. One of the ports 56' of this valve is connected to the compressed air supply line 57. Another of the ports 56² of this valve is connected to engaging mechanism (to be subsequently described) on the control machine 50, by means of tubular connections 58; and the last of the ports 56³ of this valve exhausts into the atmosphere. This valve is conveniently located at each centrifugal so that the operator can reach it easily. When the valve control handle 59 is in its full line position shown in Fig. 6, it is apparent that compressed air is admitted from the compressed air line 57 through the valve and through tubular connections 58 to the control machine 50, where it places the centrifugal under the influence of the control machine in a manner that will be presently described; and when the valve handle 59 is turned 90° in the direction of arrow "a", Fig. 6, communication is opened between tube 58 and exhaust port 56³, so that the compressed air in tube 58 is exhausted to release the centrifugal from the automatic control mechanism, as will be presently described.

Turning now to the details of the automatic control machine 50 itself, it will be seen that these details are best illustrated in Figs. 7 to 14 inclusive.

In order to permit the assembly of the apparatus into a centralized control machine as previously indicated, this machine has a frame or supporting structure comprising primarily the two end castings 60 having the two sets of guide posts 61 and 62 rising therefrom. Each of these sets of posts comprises two posts each, making a total of four posts. The end castings are joined together sideways, on one side by the bridge or beam 63 to which they are fastened by cap screws 64, and on the other side by rod 65, (see Figs. 7 and 13) to which they are fastened by cap screws 66. At the top this framework is braced and made rigid by certain members that fasten the four vertical guide posts together. Chief of these members is the valve platform 67 which is fastened against shoulders on the two guide posts 61 by means of nuts 68, as is best indicated in Fig. 12, aided by Figs. 7 and 13. There are also two cross members, 69, preferably square in shape, joining posts 61 and 62 together, and to these cross members 69 is fastened the traveling rod guide plate 70, best indicated in Figs. 7 and 13. Through suitable bearings 71 in the end castings 60 there runs an actuating shaft 72 which will be referred to later on. On the two posts 62 and guided thereby, there is a valve carriage which may be shifted up and down along said posts for the purpose of changing or adjusting the position of the valve carriage; and similarly on the two posts 61 and guided thereby, there is a stop carriage which may be shifted up and down along the posts for the purpose of changing or adjusting its position. The valve carriage includes the two sleeve members 73 and 74, see Figs. 7, 9, 12 and 13, these sleeve members having slidable engagement with the posts 62 to be guided thereby. A valve platform 75 lies across the top of the sleeves 73 and 74, and is fastened thereto by means of screws 76. A fulcrum rod 77, to be subsequently referred to, also joins the sleeves 73 and 74 together, and this rod is fastened to these sleeves by means of set screws 78. Likewise the stop carriage includes the two sleeve members 79 and 80, see Figs. 7 and 12, and these sleeve members have slidable engagement with the two posts 61 to be guided thereby, the same as sleeves 73 and 74 of the valve carriage are guided by the posts 62. The stop carriage has a stop rod 81 running across the machine, and carried by the sleeves 79 and 80. This stop rod may be embedded in a rubber bumper or cushion 82, if desired. This stop rod and bumper will be referred to again later on.

On the various parts of the framework or supporting structure just described are mounted the sets of control parts for controlling the centrifugals, there being one set of such parts for each centrifugal, as previously indicated. Since the mixer group shown in Fig. 1 contains four centrifugals, I have illustrated its control machine 50, in the various figures, as containing four such sets of control parts, which correspond with the four centrifugals in the mixer group.

By reference to Figs. 12, 13 and 14 it will be noticed that I have endeavored, by certain indicating lines, to divide the machine into four approximately equal areas designated by the reference characters A', B', C' and D'. If it be assumed that these indicating lines are prolonged or extended across the entire drawing, it will be noticed that they mark out four sets of parts, each set being practically a duplicate of the other sets. As a matter of fact, each set so indicated represents the set of control parts previously referred to for controlling each centrifugal, and as will be presently explained, the set of control parts indicated within the limits A' controls centrifugal A, and likewise the sets of control parts indicated within the limits B', C' and D', each respectively control the centrifugals B, C and D.

Since these sets of control parts are each practically duplicates of each other, the description of any one set will suffice for all of the sets, and in now making this description I will use like reference numerals to indicate like parts in the different sets.

Each set of these parts, in the particular embodiment of my invention as illustrated in the accompanying drawings, comprises the following general parts, to wit: engaging parts 83, Fig. 7, washer control valve and parts 84, power control valve and parts 85, a traveling member 86, a counterweight 87, counterweight cable 88, counterweight pulley 89, and certain connections to be presently described for the engaging parts 83, and for the washer and brake control valves 84 and 85.

I will now describe in further detail each of the general parts mentioned in the preceding paragraph.

The engaging parts 83 include a cylinder 90, the rear end of which is supported by screw 91 passing through bridge 63, as indicated in Fig. 7. At the opposite end this cylinder has a head 92 through which passes piston rod 93 having within the cylinder a piston comprising head 94 and cup leather 95. Between head 92 and piston member 94 there is located a retrieving spring 96 within which lies a spacing sleeve 97. At its outer end piston rod 93 carries a forked head 98 having the bifurcated fingers 99 resting on the actuating shaft 72, these fingers being best indicated in Figs. 7 and 14. The head 98 has a pin 100 on which there is loosely mounted a roller 101, the latter preferably being of a ball-bearing type. Compressed air may be admitted to cylinder 90 through port 102, Fig. 7, which communicates in obvious manner with pipe fitting 103. In Figs. 1 and 2, in the diagrammatic representation of the automatic control machine 50, there is indicated these four pipe fittings 103, one for each of the four sets of control parts A', B', C' and D' on machine 50, and it is to these fittings 103, as connecting points on the machine, that the previously described three-way valves 56 of the corresponding centrifugals A, B, C and D, are connected by means of the pipes or tubes 58, see Fig. 1. From these connections it is apparent that when the three-way valve 56 is set as in Fig. 6, to open communication from the compressed air supply line 57 to its pipe 58, then compressed air is admitted to its corresponding cylinder 90, on the control machine 50, and the piston rod 93 is pushed forward and roller 101 forces the traveling member 86 against the actuating shaft 72, this being clear from Fig. 7, and also from Fig. 14 which shows how the traveling member 86 is guided by means of the bifurcated fingers 99 to keep it in line with its roller 101. Also it is apparent that when the hand valve 56 is turned through 90° in the direction of arrow "a", Fig. 2, to open communication between its pipe 58 and the exhaust port 56³, the compressed air within pipe 58 and its corresponding cylinder 90 will be released or exhausted to the atmosphere, and the retrieving spring 96 within its cylinder will immediately retrieve the piston and release its traveling member 86 from the pressure under which the roller 101 had been previously holding it in frictional engagement with the actuating shaft 72. It will presently become clear, after additional parts and functions of the control machine have been described, that it is this action within the engaging cylinder 90, induced by the operation of its particular control valve 56 located at its corresponding centrifugal, that places the centrifugal under the influence of the control machine, or releases it therefrom, according as the hand valve 56 is turned one way or the other.

Turning now to the traveling member 86, it will be noticed that in this particular embodiment of my invention, the traveling member consists of a rod adapted to travel in a straight line, but in other forms of this invention the nature, shape, and motion used by the traveling member may be quite different. In this embodiment of the invention however the traveling member is shown as a straight square rod 86 guided near the lower end of the machine between shaft 72, roller 101 and the bifurcated fingers 99 of head 98, as previously described, and it is guided near the upper end of the machine by the previously described traveling rod guide plate 70 which is suitably slotted to receive and guide the traveling rods 86, as is best shown in Fig. 13, aided by Fig. 7. At a certain place on this traveling member there is a hardened steel trigger 104, best seen in Figs. 7 and 9, this trigger having a projecting head 105 on one side, and a projecting stem 106 on the other side. With this arrangement it will be understood that when the engaging cylinder 90 is energized with compressed air, the anti-friction roller 101 will press the traveling member 86 against the slowly turning shaft 72 with considerable force, and the frictional engagement so set up between member 86 and shaft 72 will cause the traveling member to rise at a substantially constant speed. This rising movement of the traveling member practically measures time either by the duration of the movement, or by the distance traversed. As this motion proceeds, the head 105 of the trigger presently comes in contact with an appropriate part of the washer control valve mechanism 84, and in a manner which will be presently described, it opens this valve for a short time to release compressed air to washer cylinder 51 on the corresponding centrifugal A, B, C or D. This starts the washing operation at that centrifugal as previously described. Thereafter, as the motion of the traveling member 86 continues, the trigger of course rises above the washer control valve 84 and presently the projecting stem 106 of the trigger reaches and opens the power and brake control valve 85, Fig. 7, as will be more fully described later on. It will be noticed that the lower end of traveling member 86 is beveled as shown at 107, Fig. 7, and when the traveling member reaches the uppermost position in its stroke, this beveled portion will rise into the saddle formed between shaft 72 and roller 101, as shown in Fig. 8, the compressed air in cylinder 90 having forced roller 101 into its extreme position as shown in this figure, the precise position being determined by the limit stop 97 within cylinder 90, which bumps against the cylinder head 92. The traveling rod 86 remains in this position shown in Fig. 8 as long as the compressed air remains in cylinder 90, but when the compressed air is released from cylinder 90 by actuating valve 56 at the centrifugal, spring 96 in cylinder 90, retrieves the piston mechanism sufficiently so that traveling rod 86 is free to drop through the entire course which it traversed during its previous rising motion. In fact, the traveling rod drops until the projecting stem portion 106 of trigger 104 comes in contact with the rubber bumper 82 on the stop rod 81, see Fig. 7, at which position the traveling member is arrested awaiting the next cycle. In order to reduce the shock or jar of this falling or retrieving movement of the traveling member 86, the weight of same is largely but not completely counterbalanced by weight 87, this weight being connected to the traveling member by means of the flexible cord or cable 88 which runs in the grooved pulley 89. These grooved pulleys are in turn loosely carried on a non-rotating shaft 108, Figs. 7, 12 and 13, which is carried by the guide posts 61 practically at their upper ends. In this way the up and down movement of traveling member 86 is smoothly accomplished, time being measured and the control functions being performed during the up-stroke, and the retrieving impact of the down-stroke being minimized and cushioned by the partial counterbalance 87 and the rubber bumper 81.

Turning now to the washer control valve and associated parts designated generally by numeral 84 in Fig. 7, it will be noticed that these parts are best shown in Fig. 9, aided by Figs. 10 and 11. The valve itself is designated at 110, and consists of a cylindrical body portion having a hole drilled axially therethrough, and having its upper exterior portion turned down to form a shoulder 111, and terminating in the upper threaded neck portion 112. In the axial hole passing through the valve body, there is formed an upwardly facing valve seat 113, and also a downwardly facing valve seat 114. In this valve body there is a movable stem comprising an upper portion 115 and a lower portion 116. The upper portion 115 has a downwardly directed valve face 117 adapted to co-act with seat 113 to open and close the valve at that place. Likewise the lower stem portion 116 has an upwardly directed valve face 118 adapted to co-act with seat 114 to open and close the valve at that place. The lower stem portion 116 terminates in a reduced rod 119, which is threaded at its upper extremity and screws into the upper stem portion 115 as indicated in Fig. 9. By means of this screw connection the distance between the upper and lower stem portion 115 and 116 is adjusted, until the distance between the valve faces 117 and 118 is slightly larger than the distance between valve seats 113 and 114. This permits the valve stem to have a little vertical movement within the valve body, the valve being closed at seat 113 when the stem is in its lowest position, and being closed at seat 114 when the stem is in its uppermost position. Compressed air is supplied to this valve through the upper part 120 of the axial hole. When the valve stem is in its uppermost position, the valve is open at seat 113 and closed at seat 114, and in this position the compressed air passes down from the valve inlet 120 and out through the valve outlet opening 121, from which it passes through connections that will presently be described, to the washer cylinder 51 on its corresponding centrifugal. If the stem thereafter drops to its lowermost position, which is the position shown in Fig. 9, the valve will be closed at seat 113 and open at seat 114, in which position the compressed air supply is cut off from inlet opening 120, and the charge of compressed air in the washer cylinder 51, and in the intervening piping, will exhaust itself by passing back through valve opening 121, down past seat 114, and out through the exhaust openings 122. The upper guiding part 123 of the valve stem is not cylindrical and therefore does not fill up the entire hole in which it rides. On the contrary, it is formed with flat faces 124 as shown in Fig. 11. It is through the space left between these flat faces and the round contour of the hole that the air passes downward through the inlet opening 120 of the valve, around the stem portion 115 and out past valve seat 113 when the valve is open at this place. Passing loosely around the lower portion of stem part 116 there is a spring 125, which, when pushed upward from below, imparts an upward thrust to stem part 116 through the washer 126 and cotter pin 127, the latter passing through the stem part 116. At the proper time the upward thrust is imparted to spring 125 by means of the sleeve 128 which fits close enough around the bottom of stem part 116 to engage the lower part of spring 125 as shown in Fig. 9, but which is still loose enough on the stem 116 so that it can slide upward on same to compress the spring. Though spring 125 is always under considerable pressure, it is not able to push sleeve 128 off the lower end of stem 116, because of the screw 129 and washer or bumper 130, which acts as a stop for sleeve 128 in a downward direction. Sleeve 128 is pivotally mounted on lever 131 by means of pin 132, and the lever 131 in its turn is pivotally mounted on the previously described fulcrum rod 77. At the outer end of lever 131 there is pivotally mounted by means of pin 133 another member 134 having a hardened tool steel lip 135 fastened to it by means of screws 136. The lip 135 and member 134 are prevented from rocking in too close to traveling rod 86, by means of the adjusting screw 137 which butts against the lower portion of member 134, this screw 137 being carried in a threaded hole 138 in the transverse portion 139 which is cast as an integral part of lever 131. The spring 140 normally holds member 134 in its position shown in Fig. 9, but obviously permits the upper part of this member to rock away from traveling rod 86. This rocking action of course takes place around pin 133. From the foregoing description it will now be understood that as the traveling rod 86 rises in the manner previously described, it will at a certain position in its course reach the position shown in Fig. 9 where the valve mechanism 84 is about to be actuated for the purpose of opening the wash fluid valve 39 to start the washing operation in the centrifugal. This entire action is automatically accomplished as follows: After the trigger head 105 makes contact with the tool steel lip 135 on member 134, the continued upward movement of head 105 with the traveling rod 86, lifts member 134, lever 131 and sleeve 128, which acting through spring 125 and pin 127, imparts an upward thrust to valve stem 116, and in a moment this valve stem is lifted from its lowermost position shown in Fig. 9 to its uppermost position wherein this valve is closed at the valve seat 114 and opened at the valve seat 113. At this instant compressed air is released or transmitted through the valve from its inlet opening 120, down past valve seat 113, and out through outlet opening 121. This outlet opening 121, as is best seen in Fig. 7, is connected by means of nipple 141, flexible hose 142, and fittings terminating in elbow 143, with pipes or tube 144, see Figs. 1 and 2, to wash cylinder 51 at the centrifugal corresponding to the particular air valve 84 which has been so actuated. As has been previously described, the compressed air in cylinder 51 opens the wash fluid valve 39 and starts the washing action going. As the latter action continues, the trigger head 105, Fig. 9, continues to rise and lift the various lever parts just mentioned, it being of course understood that lever 131 rocks around fulcrum rod 77 during this movement. On account of this rocking action the end of lip 135 passes upward through the arc of a circle 145, Fig. 9, the center of this arc being the center of fulcrum rod 77. During this lifting action the end of trigger head 105 continues to rise along the straight line 146, and when the end of the lip and the end of the trigger head reach point 147, Fig. 9, it is obvious that the lip 135 and trigger head 105 are about to release their engagement from each other. After this engagement is broken, trigger head 105 continues to rise along with traveling rod 86 just as it was previously doing, but lip 135, member 134, lever 131, and the other connected parts drop under their own weight to the position in which they originally were. During the period just described in which lip 135 was rising from its full line position shown in Fig. 9, to point 147, the corresponding upward motion of sleeve 128 was compressing spring 125 further and further. That is, at the very start of this lifting action, valve stem 116 was lifted to engage valve face 118 with valve seat 114, and thereafter no further lifting action of stem 116 was possible. The sleeve 128 however continued to rise even though stem 116 did not, and this excess motion was absorbed by sleeve 128 sliding upward along the bottom of stem 116, and compressing spring 125 above it. One of the purposes of this is to hold the valve 110 open at the valve seat 113 for an appreciable number of seconds corresponding to the vertical height of point 147 above the full line position of trigger head 105 in Fig. 9. This period during which the valve is open is made long enough to enable the compressed air to fill up all the communicating tubes and connections, and also to fully actuate the washer cylinder 51 to open the wash fluid valve 39, but on the other hand this period is also short enough to permit the valve stem 116 to drop back to its normal position, i. e., closed at seat 113 and open at seat 114, so as to permit the compressed air to be entirely exhausted from cylinder 51, and the valve stem 51′ fully retrieved under the action of spring 51⁵, Fig. 4, before the time controlled valve 39 in the Hartman washer 38 snaps automatically closed as previously indicated.

In connection with the foregoing description it is of course apparent that the moment that stem 116 in air valve 110 dropped back after point 147 had been passed by trigger head 105, so as to close the air valve at seat 113 and open it at seat 114, the compressed air was cut off from the supply point 120 by means of the closed valve seat 113, and also that the compressed air in the actuating cylinder 51 was immediately released by passing back through valve port 121, down past the open valve seat 114 and out into the atmosphere through the exhaust port 122, thereby completely exhausting the compressed air from cylinder 51 and allowing its piston to be retrieved under the action of spring 51⁵ as described. The foregoing operations of the air valve parts 84, are the ones that occur during the time when the traveling rod member 86 is rising to measure time and to lead the centrifugal through the steps of its time cycle; but during the falling or retrieving motion of the traveling member, which occurs at the end of the centrifugal cycle as previously described, the action is different. During this retrieving motion, the lower inclined face 148 of trigger head 105 comes in contact with the end of lip 135, and in an obvious manner rocks the entire member 134 in a clockwise direction around pin 133, thereby permitting the trigger head 105 to pass by lip 135 in a downward direction without affecting valve stem 116, i. e., without opening or closing valve 110 during the downward motion of the traveling member 86. The compression spring 140 retrieves member 134 to its normal position against adjusting screw 137, after the trigger head 105 has dropped down past lip 135. The foregoing description of the air valve mechanism 84 applies to each of the four sets of control parts on the control machine 50, and I will now digress for a moment to more clearly point out the connections between the four sets of control parts and the four centrifugals for covering the functions just described. The four elbows 143, see Figs. 7 and 12, are the connecting points at the control machine which communicate with the four air valves 110 embraced in the sets of control parts A′, B′, C′ and D′. In the diagrammatic view of the control machine 50, as shown in Figs. 1 and 2, these connecting points 143 are clearly indicated, and from each of these four connecting points runs a tube 144 communicating with the washer control cylinder 51 on the corresponding centrifugals A, B, C or D. These connections are best illustrated in Fig. 1. Finally, in concluding this description of the air valves, it should be noticed that the compressed air is supplied to all of them through a common header 149 best illustrated in Figs. 12 and 13, aided by Figs. 7 and 9. This header consists of a series of pipe fittings running across the four valves 110, and above them. From this header there descends to each valve a connected part 150, and as best shown in Fig. 9 the flange on the bottom of this part is fastened down onto the top of the neck portion 112 of the valve body, by means of nut 151, a suitable gasket 152 being interposed to make the joint air-tight. The second nut 153, just below nut 151, is used to fasten each of the four valves 110 onto the valve platform 75 for supporting the valves in a manner that will be obvious from the figures. Excepting for the openings into the air valves, the header 149 is of course closed all along its length except at the end 154 and this end is connected up with a piece of flexible hose 155 best shown in Fig. 7. The latter, as indicated in Figs. 13 and 14, connects up with fittings 156 on bridge 63, and to these fittings 156 the main compressed air line from the air compressor (not shown) should be connected. In this way the compressed air is supplied from the line, through header 149, down into the top of each of the four valves 110, and when any of these is opened in the manner previously described, the compressed air is transmitted to its respective washer control cylinder 51 where it opens the wash fluid valve as set forth.

Having just described the automatic control means, as used in this embodiment of my invention, for automatically opening the wash fluid control valve 39 at the centrifugals, I will now describe the automatic control means 85 for stopping the centrifugal at its proper moment in the cycle. The power control means illustrated in this form of my invention, includes a control valve 110′, see Fig. 7, similar in all respects to the previously described valve 110. In fact, these two valves 110′ and 110 are identical and interchangeable in all respects, both as to construction and mode of operation, and for that reason I have not shown a detailed sectional view of valve 110′. The description and enlarged view of valve 110, as shown in Fig. 9, applies in all respects to valve 110′. In these two valves the following parts are exact duplicates of each other: Stem 116′, Fig. 7, and stem 116, Fig. 9; cotter pin, washer and spring 127′, 126′ and 125′, Fig. 7, and the corresponding parts 127, 126 and 125, Fig. 9; likewise sleeve 128′ and pin 132′, Fig. 7, correspond identically with sleeve 128 and pin 132 in Fig. 9; and also the nuts 153′ and 151′, Fig. 7, correspond in form and function with nuts 153 and 151, Fig. 9. Above the valve 110′, and forming an inlet thereto, is the member 150′ leading downward from the header 149′ to supply compressed air to the four valves 110′, in exactly the same way that the corresponding parts 150 supply compressed air from header 149 to each of the valves 110. The valves 110′ however are carried on the valve platform 67 which is fixed in position, while the valves 110 are supported on the valve platform 75 on the valve carriage which may be moved up or down along guide posts 62, as previously described. This latter movement or adjustment of the valve carriage will be more fully referred to later in this description. In connection with valve 110′ it should be noticed that its sleeve 128′ is connected to a lever 157 by means of pin 132′, and this lever 157 is pivotally supported on a fulcrum rod 158. This fulcrum rod is in its turn supported by two posts 159, see Figs. 7, 12 and 13, which posts are carried by the valve platform 67, and fastened thereto by means of nuts 160 which screw on to the upper threaded ends of the posts. From the outlet openings of each of the valves 110′ there projects a nipple 141′ corresponding in all ways to the nipple 141 for valve 110. The nipples 141′ however, are connected by the elbows 161 and pipes 162 to the elbows 163, see Figs. 7, 13 and 14, and it is these elbows 163 that constitute the connecting points on the control machine 50, for connecting this machine with the four centrifugals for stopping them. The connections from the control machine 50 to the centrifugals are best illustrated in Figs. 1 and 2. In the diagrammatic illustration of the control means 50 in these figures, the four connecting points 163 are clearly identified, but they are shown near the top of the machine where the valves 110′ are actually located, instead of near the bottom of the machine where the elbows 163 are really located in practice, as shown in Fig. 7, this change of location having been made in Figs. 1 and 2, for the purpose of preventing confusion between the connecting points 163, 143, and 103, as might arise if all three sets of connecting points were indicated as coming from the lower part of the machine. In Fig. 1 it is seen that from each of these connecting points 163, corresponding respectively to the four previously described sets of control parts A′, B′, C′ and D′ on the control machine 50, there runs a pipe or tube 164 to each of the corresponding centrifugals A, B, C and D, and at the centrifugals these pipes 164 are connected with the power and brake control cylinders 52 and 53 of the belt driven centrifugal, or with cylinder 55, if the centrifugal is electric driven, as in Fig. 3. These connections having now been described, it will be obvious principally by reference to Figs. 7 and 8, that as the trigger 104 continues its upward motion above the wash control mechanism 84, the stem portion 106 of trigger 104 will at the proper moment contact with lever 157 of the power control mechanism just described, and will gradually lift same to a maximum height indicated by the dotted lines in Fig. 7, in which position the bottom end of traveling member 86 will have risen into its cradled position shown in Fig. 8. As has been previously described, this is the maximum position to which the traveling member 86 can be raised, and the lever 157 will be held in this uppermost dotted line position, Fig. 7, until, as previously described, the compressed air is released from behind the cup leather in the engaging cylinder 90, after which the traveling member 86 will fall away from this uppermost position, permitting lever 157 to drop back to its full line position shown in Fig. 7. From the previous description given in connection with valve 110 it will be understood that very shortly after lever 157 commences to rise and to lift with it the valve stem 116′, of valve 110′, this valve will be opened in such manner as to release or transmit compressed air through it from the supply header 149′, out through the valve outlet port and nipple 141′, and thence through pipe 162, connecting point 163, and pipe or tube 164 to the power and brake control cylinders 52 and 53 of Figs. 1 and 2, or to the cylinder 55, Fig. 3, where the compressed air will actuate these cylinders to stop the centrifugal in a manner that is obvious from previous description. It is apparent also that the compressed air will remain in these cylinders, and will hold the pistons thereof in their extended positions, so long as the traveling member 86 remains in its uppermost cradled position as shown in Fig. 8, because this holds the lever 157 and valve stem 116' in its uppermost position, as previously described. This has the advantageous feature of forcibly holding the brake in its applied position until the centrifugal is stopped. At that time, when the operator desires to release the centrifugal from the influence of the control machine, he does so by turning the three-way control valve 56 into the position shown for same under certrifugals B or D, Fig. 1, which obviously cuts off the compressed air from the engaging cylinder 90 of the corresponding set of control parts, and exhausts the compressed air from the cylinder into the atmosphere. The piston rod 93 of that cylinder is then immediately retrieved by action of the spring 96 as previously described, and the roller 101 retrieves sufficiently from its position shown in Fig. 8 to permit the traveling rod 86 to promptly drop under the unbalanced portion of its weight. This immediately releases lever 157 from its uppermost dotted line position shown in Fig. 7. This lever falls to its full line position as shown, and as previously described in connection with the corresponding valve 110, it will be understood that this cuts off the compressed air supply from cylinders 52, 53 and 55, and exhausts the same through the previously described exhaust port of the valves 110 and 110'. When the cylinders 52, 53 and 55 are so exhausted, the centrifugal is freed from the control machine, and the operator proceeds to discharge the material from that centrifugal and make it ready for the next cycle. During this time the corresponding traveling rod 86 on the control machine will have fallen or retrieved itself until the stem portion 106 of the trigger will have been arrested by the rubber bumper 82, on the stop rod 81. The traveling rod 86 will remain in this position, i. e., its stem 106 will rest on bumper 82, until the operator starts that centrifugal and its corresponding set of control parts for the next centrifugal cycle.

In the preceding paragraphs I have now described a complete set of control parts such as have been previously referred to, and it will be understood that there are four such sets of control parts, one set for each centrifugal. Should there be more than four centrifugals in the mixer, there are of course additional sets of control parts, the frame of the machine simply being made wider to accommodate the additional sets; or if there are less than four centrifugals, some of the sets of control parts are omitted, and the frame of the machine is made narrower to hold as many sets as there are centrifugals. Also it should be understood that in other forms or embodiments of my invention, the nature, construction and mode of cooperation with each other, of the parts included in these sets of control parts, can very greatly, and in addition, forces other than compressed air, or water pressure, can be utilized for transmitting to the several centrifugals, the control impulses set up or released by the control means 50. In other words, this description relates to the embodiment of the invention which I have illustrated in the drawings, but my invention is not limited to the arrangement and parts used in this particular embodiment.

A brief review of the mode of operation of the parts previously described, will now be helpful. If we assume that the operator of one of the centrifugals, B for instance, has just charged the same, and has started the centrifugal turning by applying the power as previously described, he then immediately places that centrifugal under the influence of the control machine by turning the valve 56 of that centrifugal, from the position shown for this valve under centrifugal B in Fig. 1, to a position 90° counterclockwise therefrom, which would correspond to the position shown for the similar valve under centrifugal A. This movement of the valve for centrifugal B immediately releases compressed air from line 57 through pipe 58, and connecting point 103, into the engaging parts, principally cylinder 90, of the set of control parts B' at the control machine. This immediately places centrifugal B under the influence of the control section B', and the time cycle of centrifugal B will thenceforth be governed by the set of control parts B'. The traveling member 86 of that set will commence to rise under the frictional engagement with the actuating shaft 72 which is constantly rotating in the direction of arrow "b", Fig. 7. The rate of speed with which the traveling member rises, depends on the speed with which this actuating shaft is turning, and also the diameter of same. After the traveling rod has commenced to rise, it will continue to do so for a period of time that is predetermined by the vertical distance from the top of rubber bumper 82, on stop pin 81, to the bottom of lip 135, on member 134 of the washer control mechanism. At the end of this predetermined period of time required for the traveling rod to travel through this distance, the trigger head 105 will contact with lip 135 to open the air valve 110, which opens the wash fluid valve 39 and starts the washing action at centrifugal B, in a manner previously described. The traveling rod with its trigger continues to rise above lip 135, and above the washer control mechanism, and at the end of another period of time, the length of which is predetermined by the vertical distance of lever 157 above lip 135, or above the bumper 82 on the stop pin 81, the stem portion 106 of the trigger on the traveling rod, will engage lever 157, and open air valve 110', to release compressed air to cylinders 52 and 53, or 55, which will stop the centrifugal and bring it to rest as previously described, thereby completing the cycle for centrifugal B. After releasing this centrifugal from its set of control parts by rotating the corresponding valve 56 back to its position actually shown under centrifugal B in Fig. 1, this centrifugal is released from the automatic control means, and the traveling member retrieves its movement and returns to its original position with the stem 106 of the trigger resting on the rubber bumper 82. At this time the operator discharges the centrifugal in the usual manner, recharges same, and starts it off on its next cycle by repeating the operations as just described. For each of the successive cycles the above described predetermined periods of time measured from the moment when the centrifugal is placed under the influence of the automatic control means, to the instant when the washing action is started, and to the instant when the centrifugal is disconnected from the power to stop it, will be identical so long as the vertical heights from the rubber bumper 82 to lip 135, and to lever 157, Fig. 7, remain the same. Also it is important to notice in the foregoing description that the act of placing centrifugal B under the influence of the control machine, was entirely independent of centrifugals A, C or D, it being entirely feasible to throw centrifugal B under the influence of the automatic control means entirely irrespective of what phase of their cycle the other centrifugals A, C or D are in. This independence described for centrifugal B, of course applies in their turn, to each of the other centrifugals A, C or D, or in other words, each and all of the centrifugals can be started on their time cycles in independent time relation to the other centrifugals, and likewise the several steps of washing and stopping, as between the different centrifugals, are also performed in independent time relation to each other, although the predetermined time periods between these steps, comprising the cycle for any one centrifugal, are the same for all the centrifugals. The correctness of the latter statement regarding the uniformity of the time cycle for all the centrifugals, is apparent from Fig. 7, aided by Fig. 12, wherein it appears that the vertical heights of lips 135 and levers 157 above bumper 82, are the same for all the control sections A', B', C' and D', this feature being made further apparent by the previous explanations that the several parts and relation of parts in the different control sections A', B', C' and D' are identical, or at least substantially so. This being the case it follows that the centrifugals can be operated in independent time relation of each other, but according to a time cycle that is uniform, or substantially so, for all the centrifugals, as stated.

This now brings the description down to the adjusting means previously referred to for changing these predetermined periods of time simultaneously for all the centrifugals. Such adjustment of the length of these time periods, i. e., the period to washing and to stopping of the centrifugal, should be made whenever there is a change in the character of the material being fed to the centrifugals from the common tank above. As was previously stated, the nature of this material changes from batch to batch, and even while one batch is being worked from the tank down through the centrifugals changes occur due to cooling, settling, etc. In order that the best results and the highest efficiency may be obtained, such changes usually require an adjustment in the above described time periods, and it is of importance that the operator should be able to make such adjustments quickly and conveniently, as this encourages him to keep the equipment in more perfect step with the requirements of the changing nature of the material.

As was previously indicated, this present invention greatly facilitates and improves this operation of changing or adjusting the length of any of said periods of time, and to that extent this invention increases the general usefulness of automatic control equipment for centrifugals, and also correspondingly improves the efficiency of the entire centrifugal station itself.

With former types of control equipment it was necessary to change or adjust the time periods separately and independently for each centrifugal, and this was laborious and inconvenient.

With this invention however, it is an important and basic feature that the various parts of the automatic equipment for controlling all the centrifugals, should be so associated and arranged that when any of the time periods are changed for one centrifugal, that act simultaneously changes the corresponding time period for all the centrifugals, and this feature is obviously simpler, quicker and better for the operator than for him to have to change each of the adjustments for each of the centrifugals separately.

In view of the many possible embodiments of this invention, it is obvious that the nature of this adjustment and the mode of its coaction with the control members may vary considerably.

Likewise, even in those types of this invention, where the automatic control means includes separate sets of control parts, one set for each centrifugal,—of which types the drawings illustrate one example—it is apparent that the precise nature of the adjusting means will also vary according to the nature and operation of the members making up the sets of control parts.

Turning now to the particular machine that I have illustrated in the drawings, it will be noted that any of the above described time periods, i. e., from the instant when engagement is made by cylinder 90 to the moment when the wash fluid valve 39 is opened at the centrifugal, and to the moment when the centrifugal is stopped,—can be changed simultaneously for all the centrifugals by simply changing the distances traversed by traveling members 86 in moving from the stop or bumper 82, to the lips 135, and to levers 157. In other words, these time periods can be changed by simply changing the distances between bumper 82, lips 135, and levers 157. As a matter of fact, it is interesting to note in this connection, that the various members comprising the different sets of control parts A', B', C' and D', have been especially selected and arranged with this in mind that they should combine with one another to make feasible the quick and easy changing of the above mentioned distances simultaneously for all the centrifugals, and to thereby make feasible the simultaneous changing for all the centrifugals of the corresponding time periods which are predetermined by these distances.

Any practical arrangement however, that will serve to change these time periods simultaneously for all the centrifugals, will serve as adjusting means for the purposes of this invention.

The arrangement which I have shown in the drawings for changing one of these periods, i. e., the period from the moment when cylinder 90 engages, to the moment when the power is cut off and the brake applied to the centrifugal, consists in bringing the stop or bumper 82 and lever 157, Fig. 7, closer together or further apart by shifting the previously described stop carriage, which carries stop member 82, up or down along guide posts 61. The stop carriage includes sleeves 79 and 80 running on guide posts 61, as previously described. In order to indicate the distance between stop member 82 and lever 157, or preferably the corresponding time period predetermined thereby, I use a pointer 165, Fig. 7, preferably fastened to sleeve 79 on the stop carriage. This pointer moves up and down with the stop carriage, and as best seen in Fig. 7, the pointer registers with a set of graduations on the index plate 166. This plate is fastened at its upper extremity to cross member 69 by screws 167, see Figs. 7 and 13, and it may be fastened at its lower extremity to the end casting 60 by means of bolt 168, see Fig. 14. I find it most convenient to calibrate the index plate to read in minutes and seconds, and it will be seen that the graduations which I have set out in Fig. 7 are so calibrated. The pointer 165 indicates that the particular setting of the stop carriage shown in Fig. 7 gives a predetermined time period of 3 minutes and 22 seconds from the moment when any centrifugal is placed under the influence of the control machine to the moment when the power is cut off and the brake applied to stop the centrifugal. In order to facilitate the shifting of the stop carriage in a good practical manner for changing said adjustment, I have arranged on the stop pin 81 the two gear pinions 169 best seen in Figs. 12 and 13, and also in Fig. 7. To the outer end of stop pin 81 there is securely fastened a handwheel 170, Figs. 12 and 13, the purpose of this handwheel being to rotate the stop pin, and the pinions 169 carried thereby. These pinions 169 mesh with two racks designated by reference numeral 171, best seen in Fig. 14. One of these racks is fastened along the side of the previously described index plate 166, and the other of these racks is fastened on the opposite side of the machine along the edge of a similar plate 166' which corresponds in all ways to index plate 166 except that it has no graduation thereon. The plate 166' is fastened at its upper extremity to cross member 69 of the machine frame, by means of cap screws 167', see Fig. 13, and it is fastened at its lower extremity to end casting 60 by means of bolt 168', see Fig. 14. These two racks 171, and their co-acting gears 169, are synchronized with each other to keep the stop pin 81 level and parallel in all of its positions. With this arrangement when the handwheel 170 is turned, the gears 169 turn also, and the stop carriage moves up or down along the racks 171, according as the handwheel 170 is rotated one way or the other. In order to fasten the stop carriage, and the stop pin 81, at any desired position, and hold it there, the strap member 172, (see Figs. 12 and 13) which is pivotally carried on pin 173 projecting from sleeve 79, is clamped onto the hub 174 of the handwheel, see Fig. 13, by means of bolt 175 and wing nut 176, this bolt and wing nut co-acting with lug 79' projecting from sleeve 79, as best indicated in Fig. 13. When wing nut 176 is screwed down along the bolt in the usual manner, it draws the strap member 172 over hard against the hub 174 of handwheel 170, and the frictional engagement between strap 172 and hub 174 prevents the latter from turning, and this, in view of the engagement of pinions 169 with the stationary racks 171, holds the stop carriage and the stop pin 81 firmly clamped in a level position. Before this position can be changed it is necessary to loosen the wing nut 176, after which the stop carriage can be run up or down along the guide posts 61 by turning handwheel 170 as previously described, and the stop carriage can then be refastened in its new position by refastening wing nut 176. This now concludes the description of the arrangement illustrated in the drawings for simultaneously changing for all the centrifugals, the predetermined period of time elapsing from the instant when each contrifugal is placed under the influence of the control to the instant when the power is disconnected and the brake applied to stop the centrifugal.

In approximately the same manner that the distance between stop member 82 and levers 157 is changed, as just described, so the distance from stop member 82 to lips 135 may be changed for the similar purpose of simultaneously changing for all the centrifugals the time period elapsing from the moment when any centrifugal is placed under the influence of the control, to the moment when the wash fluid valve 39 is opened at that centrifugal. To make the latter adjustment in the machine illustrated in the drawings, the previously described valve carriage including sleeves 73 and 74 and valve platform 75, is shifted up or down on the guide posts 62. The hose connections 142 leading from the several valves 110, and the hose connection 155 leading to header 149, are flexible and of sufficient length to permit this movement of the valve carriage. The pointer 177, fastened to sleeve 73 of the valve carriage, serves in conjunction with pointer 165 of the stop carriage and the graduations on index plate 166, to indicate the length of the predetermined period of time that will elapse from the moment when any centrifugal is placed under the influence of the control, to the moment when the wash fluid valve 39 at that centrifugal is opened. As a good workmanlike expedient for shifting this valve carriage along the guide posts 62, I employ racks and pinions identical with those previously described for the stop carriage. They consist of racks 178 corresponding to the previously described racks 171, but fastened to the opposite sides of plates 166 and 166'. Meshing with these racks 178 are the two gears 179 on shaft 180, the latter being rotatably mounted in lugs 181 projecting from sleeves 73 and 74. To the outer end of shaft 180 is rigidly fastened the handwheel 182, corresponding with the previously described hand wheel 170. When this handwheel 182 is rotated one way or the other, it causes the entire valve carriage to move up and down, this being accomplished by the co-action between pinions 179 and racks 178 which are synchronized with each other to always keep the valve carriage level. To fasten the valve carriage at any desired position, there is a strap member 183 drawn over against the handwheel hub 184 by means of bolt 185 and wing nut 186, the latter co-acting with the projecting lug 73' of sleeve 73, all in the same manner that the corresponding parts of the stop carriage, as previously described, cooperate with each other. When the wing nut 186 on the valve carriage is screwed down tight along bolt 185, the frictional engagement between strap 183 and the handwheel hub 184 locks the handwheel and shaft 180 against turning, and the gears 179 meshing with the stationary racks 178 hold the valve carriage in a fixed level position. To change this position it is merely necessary to loosen wing nut 186, turn handwheel 182 one way or the other as desired, and when the valve carriage is in its new desired position as indicated by pointer 177, it can be fastened there by again screwing wing nut 186 back to its tightened position. This now concludes the description of the arrangement illustrated in the drawings for simultaneously changing for all the centrifugals, the predetermined period of time elapsing from the instant when each centrifugal is placed under the influence of the control to the instant when the wash fluid valve 39 of that centrifugal is opened.

In connection with the foregoing description it is of course apparent that the one set of graduations shown on index plate 166 serve all of the centrifugals in common. This and other similar features of the unitary mixer type control, presents certain advantages that are quite useful to the average refinery or establishment using equipment of this sort. The advantages just referred to consist in the fact that such a centralized machine as I have disclosed, can if desired be somewhat removed from the centrifugal station which is often crowded, dark and dirty, and by so removing the machine to a place that is light, clean and accessible, the above described graduations and adjustments which serve all the centrifugals in common, can be kept clean and can be easily read and adjusted, all of which encourages the operator to keep the equipment accurately adjusted and in more perfect step with the gradually changing material that is passing through the centrifugals, as previously mentioned.

In connection with Figs. 1 and 2, I now point out one mode of driving the actuating shaft 72 which serves all four control sets or sections A', B', C' and D' of the control machine 50. It will be understood, of course, that this shaft must turn at a substantially constant rate of speed, as it is this speed along with the diameter of shaft 72, at the place where the latter engages traveling members 86, that determines the rate at which these members travel to measure time, as previously described. Any suitable mode of driving shaft 72 in this way, from any power source whatsoever, will be sufficient, but the arrangement shown in Fig. 1 has the advantage of mechanical simplicity. It consists in connecting shaft 72 to shaft 2 in mixer tank 1, this connection being effected through sprockets 187, 188, and drive chain 189, thereby driving shaft 72 from the mixer shaft 2.

It will be noted that this gives the control a substantially constantly rotating actuating member or drive which rotates at a substantially non-variable speed for actuating the various control parts to measure time. By referring to it as a substantially constantly rotating actuating member or drive, I mean that the rotation is continuous, and not intermittent like the centrifugal spindles 6 which go through cycles with stops in between, and by referring to it as having substantially non-variable speed, I mean that the speed is not changed, and that the timing of the various control periods is not changed or adjusted by varying the speed of the driving or actuating members. In this connection it will be noticed that the previously described time periods of the control could be changed or adjusted by simply inserting some scheme for varying at will the speed at which shaft 72, or shaft 2, is rotated, such mode of adjustment being in lieu of the mode of adjustment which I have previously described in this specification. This mode of changing the timing adjustment, however, is eliminated by defining the drive as being non-variable in speed. These speed variations, if they were used for adjusting the time periods, would have to be large and substantial in amount, and must not be confused with the incidental and rather microscopic changes that might occur due to variation of friction within the machine, or variation of load or charge in the mixer tank 1. Changes due to these causes are very slight and inconsequential, and do not rob the drive which has just been described in this paragraph, and shown in Fig. 1, of its qualities as a non-variable speed drive, wherein the timing adjustments are made as hereinbefore described, and without deliberately and intentionally varying the driving speed of the actuating members. The form of such non-variable speed drives can of course differ greatly.

In connection with Fig. 2, I will now describe my automatic mode of throwing the liquor gate 30 to direct liquor first to trough 31 and subsequently to trough 32, as was previously described. When the wash fluid control valve 39 is opened under the influence of the control machine 50, the washing fluid commences to flow from some constant pressure tank or source not shown in the drawings, through inlet connection 41 into valve 39, through same, and through the outlet connection 191 from this valve, through hose 42 and out through nozzle 44 to wash the material in the centrifugal. At a place between this wash fluid control valve 39 and nozzle 44, I insert a by-pass fitting 193, which by-passes a small amount of the wash fluid released from valve 39 down through the pipe fittings 194 to the gate control cylinder 195, see Fig. 2. In these pipe fittings 194 there is inserted some sort of a fine regulating valve 196, and a check valve 197, the latter being adapted to permit the wash fluid to flow from valve 39 toward cylinder 195, but not in the reverse direction. Also communicating with cylinder 195 by means of pipe fittings 198 is a release valve 199 having a forked lever 200 cooperating with pin 201 inserted in the counterweight ball 37 or in some other portion of the charging gate mechanism of which counterweight 37 is a part. Release valve 199 is an ordinary valve and has communication on one side with cylinder 195 through pipe 198, and on the other side with a discharge pipe 202 discharging to any suitable place. The relation between valve 199, forked lever 200, pin 201, and the pivot 35 of the charging gate, is such that when the charging gate 34 is closed to cut off the flow of material from chute 33 into the centrifugal then valve 199 is also closed, but when the charging gate 34 is opened to charge material into the centrifugal, then release valve 199 is opened to establish direct communication from pipe 198 to exhaust pipe 202 through this valve. In the gate throwing cylinder 195 there is a fluid tight piston 203 which is connected to the rear end of gate 30 by means of a connecting rod 204. Obviously when fluid under pressure is admitted to cylinder 195 beneath piston 203, the arrangement just described will shift the liquor gate 30 from its full line position shown in Fig. 2, to its dotted line position, and when the fluid pressure beneath piston 203 is released the counterweight 205 will retrieve the gate from its dotted line position to its full line position. As a means for retrieving the gate 30 in this manner, a spring, or any other suitable expedient or arrangement may be used, but I have found the counterweight quite practical for this purpose. The operation of the apparatus described in this paragraph is as follows: At the beginning of the cycle, while the operator opens the charging gate 34 for the purpose of charging material from spout 33 into the centrifugal, the release valve 199 will have been opened as described, insuring that the retrieving counterweight 205 has brought gate 30 into its full line position, Fig. 2, the washing fluid below piston 203 having been forced from cylinder 195 out through release valve 199 and exhaust port 200 to permit this, because of the force of the retrieving counterweight 205. After the centrifugal is charged, gate 34 is closed by means of lever 36, and this action simultaneously closes the release valve 199. The operator turns the power on the centrifugal and places the centrifugal under the influence of the control means. As the centrifugal commences to spin the liquor components of the material in the basket will spin out of same on to curbing 28, from which this liquor drains down through opening 29 on to gate 30 which, as explained, will be in its full line position shown in Fig. 2. In this position the gate 30 directs this original liquor into the liquor trough 31. At the proper moment the automatic control means 50 will automatically open the wash fluid valve 39, which action permits the wash fluid to pass from this valve through connections 191, 193 and 192 to nozzle 44 for spraying the material in the centrifugal. The pressure of the wash fluid thus released into these connections by valve 39 will be transmitted through the by-pass T or fitting 193, and some of this washing fluid will pass through pipes 194, throttling valve 196, and check valve 197 into cylinder 195. This fluid will raise piston 203 and will in an obvious manner shift gate 30 from its full line to its dotted line position after which the wash liquor then spinning from the basket on to curbing 28 and out through drain spout 29, will be directed by gate 30 into the wash liquor trough 32. The washing operation will continue in the usual manner, and when the desired amount of water for which the automatic washing mechanism is set has been discharged, the wash fluid valve 39 will automatically close, and no more fluid will be sprayed into the centrifugal during that cycle. The liquor gate 30 however, will remain in its dotted line position and will continue to direct the liquor that spins out of the basket while the material is drying, into the wash liquor trough 32. This is true in spite of the force of the counterweight 205, or other retrieving means which may be used in its stead. In spite of the retrieving means the piston 203 in cylinder 195 will be held in its uppermost position, because the release valve 199 is closed at this time, and the check valve 197 will not permit the fluid to pass through it from cylinder 195 toward the washer. The cycle therefore will continue in its usual manner with gate 30 remaining in its dotted line position shown in Fig. 2. At the end of the cycle however, after the centrifugal material has been discharged from basket 5, the operator opens the charging gate 34 by means of lever 36, to admit a new charge of material into the centrifugal. When he does this, the release valve 199 is automatically opened as previously described, and under the action of the retrieving means the fluid is forced out of cylinder 195 through the open release valve 199 and discharge port 202, thereby permitting gate 30 to be retrieved to its full line position, Fig. 2, in readiness for the next cycle. The next cycle will be repeated in the same manner as the one just described, and so on for all successive cycles thereafter. As mentioned in the early parts of this specification, any form of automatic washing means may be used as well the Hartman patented washer illustrated in the drawings. It is characteristic of all these automatic washers that they have some sort of a nozzle equivalent to nozzle 44, and also some sort of a wash fluid control valve equivalent to valve 39 shown herein, and so far as concerns the gate throwing apparatus described in this paragraph, the same will operate as satisfactorily with any other washing means, as with the Hartman, the only requisite being that the previously described pipes 194 should communicate with the washer connections at a place between the wash fluid control valve that turns on the washing fluid, and the nozzle through which the fluid is sprayed into the centrifugal. The check valve 197 is of course included in these connections. The purpose of the throttling valve 196 is to retard the flow of the fluid into cylinder 195, so as to retard the precise moment at which the liquor from spout 29 is changed over from trough 31 to trough 32. Retarding this moment has the advantage of bringing into the original liquor trough 31 all the original liquor that coated curbing 28 at the instant that the washing action commenced. If there were no such retardation, and the shifting of gate 30 occurred simultaneously with the opening of the wash fluid valve 39, this portion of the original liquor would drain into the wash liquor trough 32, instead of into the original liquor trough 31 where it belongs. The amount of retardation can be governed in an obvious manner by the throttle valve 196. In some industries, where the amount of this retardation is not so important, so that it is practically unnecessary ever to change it, the valve 196 may be omitted, and such retardation as may be desired can be procured by simply selecting pipe 194 to be of very small bore, or else in using pipe of ordinary size and replacing valve 196 with some fitting that has a restricted opening through it that is substantially smaller than pipe 194.

I would now like to call attention to a very useful modification that I have shown in Fig. 1ª. This shows the three-way air valve 56 located in relation to the previously described power control shaft 18, in such manner that this valve 56 will be automatically actuated to throw its centrifugal under the influence of the automatic control means by the mere action of turning the power on to the centrifugal. In this figure all connections from valve 56 to the control machine and to the supply line 57 are identical with the connections shown and described for Fig. 2. In this figure, and to simplify same, all parts connected with shaft 18 have been omitted, except the projecting arm 206 which is fastened to rotate with shaft 18 for the express purpose of automatically actuating lever 59 of valve 56. When the power is fully on, the arm 206 will be in its full line position shown in Fig. 1ª, and it will hold valve lever 59 in its full line position as shown in this figure, which corresponds to the operating position, i. e., the position in which the centrifugal is under the influence of the automatic control, and the centrifugal is spinning and going through its cycle. When the control equipment finally actuates shaft 18 to stop the centrifugal, the arm 206 is swung from its full line position in Fig. 1ª, to its dotted line position. The valve lever 59 however, remains in its full line position until the operator reaches the centrifugal and desires to release it from the automatic control. He does this by manually moving lever 59 from its full to its dotted line position in Fig. 1ª, which releases the centrifugal from the control as previously described. Thereafter, when the operator is ready to start the centrifugal on its next cycle which he does by rocking handwheel 19 shown in Fig. 2, but not in Fig. 1ª, to its full speed position, this turns shaft 18 and arm 206 sufficiently to swing the latter from its dotted line position in Fig. 1ª to its full line position. In the course of this movement the arm 206 engages with lever 59 which is in its dotted position shown in Fig. 1ª, and in an obvious manner shifts this lever from this dotted position to its full line position. In this way the valve 56 is automatically actuated to put the centrifugal under the influence of the automatic control means, or in other words, the mere act of applying the power to the centrifugal simultaneously places the centrifugal under the influence of the automatic control.

In concluding this description of the various parts of my equipment, I wish to call attention to the fact that several features and parts thereof can be used separately and independently of the entire combined equipment which I have shown and described. For instance, in some applications of this invention there is no necessity for washing the material in the centrifugals, and the only requirement is to automatically stop the centrifugals. In these cases only such of the previously described equipment is required as automatically operates to stop the centrifugals after a predetermined period of time, and adjusting means for simultaneously changing the length of this period of time for all centrifugals as described. Likewise it is not always necessary to make a separation of the wash liquor from the original liquor which comes from the drain spout at the bottom of the curbing, and in these cases the gate shifting means can of course be omitted, although it is also true that this gate shifting means may be used independently of the automatic equipment. In other words, there are several of such subcombinations of the general combined equipment which I have disclosed in this application, and I desire to separately cover these subcombinations in this application irrespective of whether they are separately used to procure the special utility of which they are susceptible, or whether they are connected with other subcombinations, parts, and arrangements to form the complete combined equipment described herein.

From the foregoing detailed description it is now thought that this invention and the mode of operating same will be clear, particularly in regard to the important and dominating feature whereby the predetermined periods of time which automatically control the action of opening the wash fluid valves, and of stopping the various centrifugals, can be simultaneously and easily changed for all the centrifugals. In regard to this feature I believe my invention is basic and pioneer, and that I am entitled to cover it broadly.

I claim:

1. In combination, a plurality of centrifugals, automatic control means including sets of control parts one set for each centrifugal for automatically stopping its centrifugal after a predetermined period of time, a substantially constantly rotating actuating member rotating at substantially non-variable speed for actuating the control parts to measure time, and adjusting means co-acting with all of said sets of control parts for changing the length of said predetermined period of time simultaneously for all of said centrifugals without varying the speed of said constantly rotating actuating member.

2. In combination, a plurality of centrifugals adapted to centrifuge material charged therein, means for driving said centrifugals, a fluid valve for each centrifugal adapted to turn on a washing fluid for washing the material in its centrifugal, automatic control means including sets of control parts one set for each of said fluid valves for automatically opening its fluid valve after a predetermined period of time, a substantially constantly rotating actuating member rotating at substantially non-variable speed for actuating the control parts to measure time, and adjusting means co-acting with all of said sets of control parts for changing the length of said predetermined period of time simultaneously for all of said fluid valves without varying the speed of said constantly rotating actuating member.

3. In combination, a plurality of centrifugals, means for starting said centrifugals in independent time relation of each other, automatic control means for stopping said centrifugals independently of each other but after a predetermined period of time which is equal for all of said centrifugals, a substantially constantly rotating actuating member rotating at substantially non-variable speed for actuating the control means to measure time, and adjusting means adapted to change the length of said predetermined period of time simultaneously for all of said centrifugals without varying the speed of said constantly rotating actuating member.

4. In combination, a plurality of centrifugals, driving means for each centrifugal, means for each centrifugal for connecting and disconnecting its said driving means to a source of power, automatic control means including sets of control parts one set for each centrifugal for disconnecting the said driving means of that centrifugal from said power source after a predetermined period of time, a substantially constantly rotating actuating member rotating at substantially non-variable speed for actuating each of said sets of control parts to measure time, and adjusting means common to all of said sets of control parts for changing the length of said predetermined period of time simultaneously for all of said centrifugals without varying the speed of said constantly rotating actuating member.

5. In combination, a plurality of centrifugals adapted to centrifuge material charged therein, means for driving said centrifugals, washing means for each centrifugal including a fluid valve and a nozzle, automatic control mechanism for each of said fluid valves for opening said fluid valves in independent time relation of each other but after a predetermined period of time common to all of said valves, a substantially constantly rotating actuating member rotating at substantially non-variable speed for actuating said automatic control mechanisms to measure time, and adjusting means common to all of said automatic control mechanisms and adapted to change the length of said predetermined period of time simultaneously for all of said fluid valves without varying the speed of said constantly rotating actuating member.

6. In combination, a plurality of centrifugals adapted to centrifuge material charged therein, a washer valve for each centrifugal adapted to turn on a washing fluid for washing the material in its centrifugal, automatic control means for automatically opening said washer valves in independent time relation of each other but after a predetermined period of time which is equal for all of said washer valves, adjusting means for changing the length of said predetermined period of time simultaneously for all of said washer valves, automatic control means for automatically stopping said centrifugals in independent time relation of each other but after a predetermined period of time that is equal for all of said centrifugals, adjusting means for changing the last said predetermined period of time simultaneously for all of said centrifugals, and a substantially constantly rotating actuating shaft rotating at substantially non-variable speed and having mechanical engagement with said automatic control means for actuating it to measure time.

7. In combination, a plurality of centrifugals, automatic control means for automatically stopping said centrifugals in independent time relation of each other but after a predetermined period of time common to all of said centrifugals, and adjusting means adapted to change the length of said predetermined period of time simultaneously for all of said centrifugals.

8. In combination, a plurality of centrifugals, automatic control means for automatically stopping said centrifugals in independent time relation of each other but after a predetermined period of time common to all of said centrifugals, a substantially constantly rotating actuating member roating at substantially non-variable speed for actuating the automatic control means to measure time, adjusting means adapted to change the length of said predetermined period of time simultaneously for all of said centrifugals, without varying the speed of said constantly rotating actuating member, and one set of graduations acting in conjunction with said adjusting means for serving all of said centrifugals to indicate the length of said predetermined period of time.

9. In combination, a plurality of centrifugals adapted to centrifuge material charged therein, means for driving said centrifugals, washing means for each centrifugal, automatic control means for automatically starting said several washing means in independent time relation of each other but after a predetermined period of time common to all, a substantially constantly rotating actuating member rotating at substantially non-variable speed for actuating the automatic control means to measure time, and adjusting means adapted to change the length of said predetermined period of time simultaneously for all of said several washing means without varying the speed of said constantly rotating actuating member.

10. In combination a plurality of centrifugals adapted to centrifuge material charged therein, means for driving said centrifugals, washing means for each centrifugal, automatic control means for automatically starting said washing means for the different centrifugals in independent time relation of each other but after a predetermined period of time common to all, a substantialy constantly rotating actuating member rotating at substantially non-variable speed for actuating said automatic control means to measure time, adjusting means adapted to change the length of said predetermined period of time simultaneously for the washing means of all of said centrifugals, without varying the speed of said constantly rotating actuating member, and one set of graduations acting in conjunction with said adjusting means for serving all of said centrifugals to indicate the length of said predetermined period of time.

11. In combination, a plurality of centrifugals, automatic control mechanism for each centrifugal for automatically stopping its centrifugal in independent time relation of the other centrifugals but after a predetermined period of time common to all of said centrifugals, and a substantially constantly revolving shaft rotating at substantially non-variable speed and adapted to have mechanical engagement with all of said automatic control mechanisms for actuating them to measure time.

12. In combination, a plurality of centrifugals, means for starting said centrifugals in independent time relation of each other, automatic control means for automatically stopping said centrifugals independently of each other but after a predetermined period of time common to all of said centrifugals, said automatic control means including a separate set of control parts for each centrifugal, each of said sets of control parts having a traveling member adapted to move in a straight line in one direction and adapted at a certain position in its movement in that direction to co-act with other parts of its said set of control parts to stop its particular centrifugal, said traveling member being also adapted to be retrieved by moving in a straight line in the opposite direction, and a stop means common to all of said traveling members for arresting the said retrieving motion of all of said traveling members at a certain position, said stop means being adjustable in position to simultaneously change the position at which all of said traveling members are arrested during their retrieving motion.

13. In combination, a plurality of centrifugals, means for starting said centrifugals in independent time relation of each other, automatic control mechanism for automatically stopping said centrifugals independently of each other but after a predetermined period of time common to all of said centrifugals, said automatic control mechanism including a separate set of control parts for each centrifugal, each of said sets of control parts having a control valve adapted to release compressed air to stop its centrifugal, each of said sets of control parts also having a traveling member adapted to move in one direction and adapted at a certain position in its movement in that direction to co-act with said control valve to release the compressed air to stop its centrifugal, said traveling member being also adapted to be retrieved by moving in the opposite direction, and a stop means common to all of said traveling members for arresting the said retrieving motion of all of said traveling members at a certain position, said stop means being adjustable in position to simultaneously change the position at which all of said traveling members are arrested during their said retrieving motion.

14. In combination, a plurality of centrifugals, automatic control means for automatically stopping said centrifugals in independent time relation of each other but after a predetermined period of time common to all of said centrifugals, said automatic control means having a supporting structure, also having a separate set of control parts for each centrifugal, and also having a substantially constantly rotating actuating shaft rotating at a substantially non-variable speed and adapted to have engagement with each of said sets of control parts for actuating them, said common actuating shaft and said sets of control parts for controlling the several centrifugals being assembled as a unitary machine on said supporting structure.

15. In combination, a tank adapted to hold material, a mixer shaft adapted to stir the material in said tank, a plurality of centrifugals, means for supplying material from said tank to each of said centrifugals, automatic control means for automatically stopping said centrifugals in independent time relation of each other but after a predetermined period of time common to all said centrifugals, an actuating shaft for actuating said automatic control means to measure time, and drive means connecting said mixer shaft and said actuating shaft for driving the latter in a fixed speed relation to the former.

16. In combination, a tank adapted to hold material, a mixer shaft for stirring the material in said tank, a plurality of centrifugals, means for supplying material from said tank to each of said centrifugals, automatic control mechanism for each centrifugal for automatically stopping its centrifugal after a predetermined period of time, an actuating shaft common to all of said several automatic control mechanisms for actuating them to measure time, and drive means connecting said mixer shaft and said actuating shaft for driving the latter in a fixed speed relation to the former.

17. In combination, a plurality of centrifugals, a centralized automatic control machine for controlling all of said centrifugals, means whereby each of said centrifugals can be independently placed under the influence of said centralized automatic control machine, said automatic control machine being adapted to automatically stop each centrifugal at a predetermined period of time after the centrifugal was placed under the influence of said automatic control machine, a substantially constantly rotating actuating member rotating at substantially non-variable speed for actuating said automatic control machine to measure time, and adjusting means for said automatic control machine adapted to change the length of said predetermined period of time simultaneously for all of said centrifugals without varying the speed of said constantly rotating actuating member.

18. In combination, a plurality of centrifugals, automatic control means for automatically stopping all of said centrifugals, said automatic control means including sets of control parts one set for each centrifugal, means for placing each centrifugal under the influence of its said set of control parts in independent time relation to the other centrifugals, each of said sets of control parts being adapted to automatically stop its centrifugal at the end of a predetermined period of time after the centrifugal was placed under the influence of its set of control parts, a substantially constantly rotating actuating member rotating at substantially non-variable speed for actuating each of said sets of control parts to measure time, and adjusting means cooperating with all of said sets of control parts for changing the length of said predetermined period of time simultaneously for all of said centrifugals without varying the speed of said constantly rotating actuating member.

19. In combination, a plurality of centrifugals, automatic control means for automatically stopping all of said centrifugals, said automatic control means including actuating cylinders at said centrifugals, said automatic control means also including sets of control parts one set for each centrifugal, each of said sets of automatic control parts also including a valve adapted to release a pressure medium to actuate said cylinder at its centrifugal, means for placing each centrifugal under the influence of its said set of control parts in independent time relation to the other centrifugals, each of said sets of control parts being adapted to automatically stop its centrifugal by opening its said valve at the end of a predetermined period of time after the centrifugal was placed under the influence of its set of control parts, and adjusting means cooperating with all of said sets of control parts for changing the length of said predetermined period of time simultaneously for all of said centrifugals.

20. In combination, a plurality of centrifugals adapted to centrifuge material charged therein, means for driving said centrifugals a wash fluid valve for each centrifugal adapted to turn on and off a washing fluid for washing the material in its centrifugal, automatic control means for automatically controlling all of said wash fluid valves for said several centrifugals, means whereby each of said centrifugals can be placed under the influence of said automatic control means independently of the other centrifugals, said automatic control means being adapted to automatically open each of said wash fluid valves at the end of a predetermined period of time after the centrifugal corresponding to that valve was placed under the influence of said automatic control means, a substantially constantly rotating actuating member rotating at substantially non-variable speed for actuating said automatic control means to measure time, and adjusting means for changing the length of said predetermined period of time simultaneously for all of said centrifugals without varying the speed of said constantly rotating actuating members.

21. In combination, a plurality of centrifugals adapted to centrifuge material charged therein, means for driving said centrifugals, a wash fluid valve for each centrifugal adapted to turn on and off a washing fluid for washing the material in its centrifugal, automatic control means for automatically opening each of said wash fluid valves, said automatic control means including sets of control parts one set for each centrifugal, means for placing each centrifugal under the influence of its said set of control parts in independent time relation to the other centrifugals, each of said sets of control parts being adapted to automatically open the said wash fluid valve of its centrifugal at the end of a predetermined period of time after its centrifugal was placed under the influence of its said set of control parts, a substantially constantly rotating actuating member rotating at substantially non-variable speed for actuating each of said sets of control parts to measure time, and adjusting means cooperating with all of said sets of control parts for changing the length of said predetermined period of time simultaneously for all of said centrifugals without varying the speed of said constantly rotating actuating member.

22. In combination, a plurality of centrifugals adapted to centrifuge material charged therein, a wash fluid valve for each centrifugal adapted to turn on and off a washing fluid for washing the material in its centrifugal, means including an actuating cylinder for stopping each centrifugal, automatic control means for automatically controlling all of said centrifugals, said automatic control means including sets of control parts one set for each centrifugal, each of said sets of control parts including a control valve adapted when open to release a pressure medium to actuate said cylinder at its centrifugal to stop the centrifugal, means for placing each centrifugal under the influence of its said set of control parts in independent time relation to the other centrifugals the last said means including a three-way valve adapted to release a pressure medium from its centrifugal to its said set of control parts to engage the same, each of said sets of control parts being adapted to automatically open the wash fluid valve of its centrifugal at the end of a predetermined period of time after its centrifugal was placed under the influence of its said set of control parts, adjusting means cooperating with the said sets of control parts for the several centrifugals for changing the length of said predetermined period of time simultaneously for all of said centrifugals, each of said sets of control parts being also adapted to automatically stop its centrifugal by automatically opening its said control valve at the end of another predetermined period of time, and adjusting means also cooperating with the said sets of control parts for the several centrifugals for changing the last said predetermined period of time simultaneously for all of said centrifugals.

23. In combination, a plurality of centrifugals, automatic control means for automatically stopping said centrifugals in independent time relation of each other but after a predetermined period of time common to all of said centrifugals, a substantially constantly rotating actuating member rotating at substantially non-variable speed for actuating said automatic control means to measure time, and adjusting means adapted to change the length of said predetermined period of time simultaneously for all of said centrifugals without varying the speed of said constantly rotating actuating member.

In testimony whereof, I have executed these presents on this 29th day of June, 1927, in the city and county of New York, State of New York.

ROBERT ALEXANDER STEPS.